United States Patent
Seo et al.

(10) Patent No.: US 10,039,127 B2
(45) Date of Patent: Jul. 31, 2018

(54) METHOD AND DEVICE FOR ALLOCATING RESOURCES IN MULTIPLE FREQUENCY BAND SYSTEM

(71) Applicant: LG Electronics Inc., Seoul (KR)

(72) Inventors: Dong Youn Seo, Anyang-si (KR); Jung Kui Ahn, Anyang-si (KR); Jung Hoon Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 15 days.

(21) Appl. No.: 14/527,589

(22) Filed: Oct. 29, 2014

(65) Prior Publication Data
US 2015/0063265 A1    Mar. 5, 2015

Related U.S. Application Data

(63) Continuation of application No. 12/993,045, filed as application No. PCT/KR2009/004399 on Aug. 6, 2009, now Pat. No. 8,897,283.
(Continued)

(30) Foreign Application Priority Data
Jul. 30, 2009    (KR) ........................ 10-2009-0070065

(51) Int. Cl.
H04W 72/04    (2009.01)
H04W 72/12    (2009.01)
H04L 5/00    (2006.01)

(52) U.S. Cl.
CPC ........... *H04W 72/1289* (2013.01); *H04L 5/00* (2013.01); *H04L 5/003* (2013.01); *H04L 5/0094* (2013.01); *H04W 72/0446* (2013.01)

(58) Field of Classification Search
CPC ............... H04W 72/04; H04W 72/048; H04W 72/0406
(Continued)

(56) References Cited

U.S. PATENT DOCUMENTS

2004/0218523 A1    11/2004    Varshney et al.
2006/0018397 A1    1/2006    Sampath et al.
(Continued)

FOREIGN PATENT DOCUMENTS

CN    101043495 A    9/2007
CN    101064955 A    10/2007
(Continued)

OTHER PUBLICATIONS

"DL Unicast Resource Allocation Signalling using L1L2 control channels", R1-072832, TSG-RAN WG1#49Bis, Jun. 25-29, 2007, pp. 1-6.*
(Continued)

*Primary Examiner* — Andrew W Chriss
*Assistant Examiner* — Kenan Cehic
(74) *Attorney, Agent, or Firm* — Birch, Stewart, Kolasch & Birch, LLP

(57) ABSTRACT

A method is described for receiving data from a base station by a first type user equipment (UE) capable of using a plurality of frequency bands based on resource allocation in a first wireless mobile communication system capable of using the plurality of frequency bands. Each of the plurality of frequency bands has a respective bandwidth for a second wireless mobile communication system. Specific control information is received from the base station indicating whether a specific frequency band among the plurality of frequency bands is used for downlink resource allocation or not. Control information reception resources comprise a common resource area and a first type UE-specific resource area. The common resource area is for both the first type UE
(Continued)

DL resource allocation for
Legacy UE
(ex F-Block A)

100 RB    →0≤ Valid RIV ≤ 100·101/2-1=5049<2$^{13}$
→5050≤ Invalid RIV ≤ 2$^{13}$ -1=1111111111111$_2$ DL resource allocation for
Legacy UE with K F-Block
reception configuration
(ex K=3, F-Block A C E)

→0≤ Valid RIV ≤ 100·101/2-1=5049<2$^{13}$
100 RB →5050≤ Invalid RIV ≤ 2$^{13}$-2=1111111111110$_2$
→1111111111111$_2$ :RB Length=0 and a second type UE, the second type UE adapted for the second wireless mobile communication system not capable of using the plurality of frequency bands.

10 Claims, 23 Drawing Sheets

Related U.S. Application Data

(60) Provisional application No. 61/087,171, filed on Aug. 8, 2008.

(58) Field of Classification Search
USPC .................................. 370/206, 208, 310–350
See application file for complete search history.

(56) References Cited

U.S. PATENT DOCUMENTS

| | | |
|---|---|---|
| 2007/0242636 A1 | 10/2007 | Kashima et al. |
| 2007/0287464 A1 | 12/2007 | Hamamoto et al. |
| 2008/0013599 A1 | 1/2008 | Malladi |
| 2008/0031191 A1 | 2/2008 | Kashima et al. |
| 2008/0187005 A1 | 8/2008 | Chauviere et al. |
| 2009/0103562 A1 | 4/2009 | Frederiksen et al. |
| 2010/0027481 A1 | 2/2010 | Lindh et al. |
| 2010/0067479 A1 | 3/2010 | Choi et al. |
| 2010/0098020 A1 | 4/2010 | Kim et al. |
| 2010/0151874 A1* | 6/2010 | Cai .................... H04W 76/06 455/452.1 |
| 2010/0260036 A1 | 10/2010 | Molnar et al. |
| 2011/0059767 A1* | 3/2011 | Parkvall ................ H04L 1/1635 455/550.1 |
| 2011/0103333 A1* | 5/2011 | Berggren ................ H04L 5/001 370/329 |
| 2011/0122830 A1 | 5/2011 | Dai et al. |

FOREIGN PATENT DOCUMENTS

| | | |
|---|---|---|
| CN | 101132267 A | 2/2008 |
| KR | 10-2008-0030942 A | 4/2008 |
| KR | 10-2008-0039772 A | 5/2008 |
| WO | WO 2006/130541 A2 | 12/2006 |
| WO | WO 2008/054157 A2 | 5/2008 |

OTHER PUBLICATIONS

NEC Group, "DL Unicast Resource Allocation Signalling using L1L2 control channels", TSG-RAN WG1#49bis, R1-072832, Orlando, USA, Jun. 25-29, 2007, 6 pages.

Panasonic et al., "Resource Allocation for Distributed VRB," Change Request 36.213 CR 0200, 3GPP TSG-RAN1 Meeting #53, R1-082154, Kansas City, Missouri, USA, May 5-9, 2008, 2 pages.

Samsung, "UE feedback and scheduling considerations for 4-Tx antenna MIMO", 3GPP TSG RAN WG1 Meeting #47, R1-063262, Riga, Latvia, Nov. 6-10, 2006, pp. 1-10.

Ericsson, "Introducing missing L1 parameters into 36.213," 3GPP TSG-RAN Meeting #53bis, R1-082734, Warsaw, Poland, Jun. 30-Jul. 4, 2008, 38 pages.

* cited by examiner

FIG. 20

| L\S | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 1 | 0 | 1 | 2 | 3 | 4 | 5 | 6 | 7 | 8 | 9 | 10 | 11 | 12 | 13 | 14 | 15 | 16 | 17 | 18 | 19 |
| 2 | 20 | 21 | 22 | 23 | 24 | 25 | 26 | 27 | 28 | 29 | 30 | 31 | 32 | 33 | 34 | 35 | 36 | 37 | 38 | 39 |
| 3 | 40 | 41 | 42 | 43 | 44 | 45 | 46 | 47 | 48 | 49 | 50 | 51 | 52 | 53 | 54 | 55 | 56 | 57 | 58 | 59 |
| 4 | 60 | 61 | 62 | 63 | 64 | 65 | 66 | 67 | 68 | 69 | 70 | 71 | 72 | 73 | 74 | 75 | 76 | 77 | 78 | 79 |
| 5 | 80 | 81 | 82 | 83 | 84 | 85 | 86 | 87 | 88 | 89 | 90 | 91 | 92 | 93 | 94 | 95 | 96 | 97 | 98 | 99 |
| 6 | 100 | 101 | 102 | 103 | 104 | 105 | 106 | 107 | 108 | 109 | 110 | 111 | 112 | 113 | 114 | 115 | 116 | 117 | 118 | 119 |
| 7 | 120 | 121 | 122 | 123 | 124 | 125 | 126 | 127 | 128 | 129 | 130 | 131 | 132 | 133 | 134 | 135 | 135 | 137 | 138 | 139 |
| 8 | 140 | 141 | 142 | 143 | 144 | 145 | 146 | 147 | 148 | 149 | 150 | 151 | 152 | 153 | 154 | 155 | 156 | 157 | 158 | 159 |
| 9 | 160 | 161 | 162 | 163 | 164 | 165 | 166 | 167 | 168 | 169 | 170 | 171 | 172 | 173 | 174 | 175 | 176 | 177 | 178 | 179 |
| 10 | 180 | 181 | 182 | 183 | 184 | 185 | 186 | 187 | 188 | 189 | 190 | 191 | 192 | 193 | 194 | 195 | 196 | 197 | 198 | 199 |
| 11 | 200 | 201 | 202 | 203 | 204 | 205 | 206 | 207 | 208 | 209 | 210 | 211 | 212 | 213 | 214 | 215 | 216 | 217 | 218 | 219 |
| 12 | 199 | 198 | 197 | 196 | 195 | 194 | 193 | 192 | 191 | 190 | 189 | 188 | 187 | 186 | 185 | 184 | 183 | 182 | 181 | 180 |
| 13 | 179 | 178 | 177 | 176 | 175 | 174 | 173 | 172 | 171 | 170 | 169 | 168 | 167 | 166 | 165 | 164 | 163 | 162 | 161 | 160 |
| 14 | 159 | 158 | 157 | 156 | 155 | 154 | 153 | 152 | 151 | 150 | 149 | 148 | 147 | 146 | 145 | 144 | 143 | 142 | 141 | 140 |
| 15 | 139 | 138 | 137 | 136 | 135 | 134 | 133 | 132 | 131 | 130 | 129 | 128 | 127 | 126 | 125 | 124 | 123 | 122 | 121 | 120 |
| 16 | 119 | 118 | 117 | 116 | 115 | 114 | 113 | 112 | 111 | 110 | 109 | 108 | 107 | 106 | 105 | 104 | 103 | 102 | 101 | 100 |
| 17 | 99 | 98 | 97 | 96 | 95 | 94 | 93 | 92 | 91 | 90 | 89 | 88 | 87 | 86 | 85 | 84 | 83 | 82 | 81 | 80 |
| 18 | 79 | 78 | 77 | 76 | 75 | 74 | 73 | 72 | 71 | 70 | 69 | 68 | 67 | 66 | 65 | 64 | 63 | 62 | 61 | 60 |
| 19 | 59 | 58 | 57 | 56 | 55 | 54 | 53 | 52 | 51 | 50 | 49 | 48 | 47 | 46 | 45 | 44 | 43 | 42 | 41 | 40 |
| 20 | 39 | 38 | 37 | 36 | 35 | 34 | 33 | 32 | 31 | 30 | 29 | 28 | 27 | 26 | 25 | 24 | 23 | 22 | 21 | 20 |

METHOD AND DEVICE FOR ALLOCATING RESOURCES IN MULTIPLE FREQUENCY BAND SYSTEM

CROSS-REFERENCE TO RELATED APPLICATIONS

This application is a continuation application of co-pending U.S. application Ser. No. 12/993,045 filed on Nov. 16, 2010, which is the National Phase of PCT/KR2009/004399 filed on Aug. 6, 2009, which claims priority under 35 U.S.C. 119(e) to U.S. Provisional Application No. 61/087,171 filed on Aug. 8, 2008 and under 35 U.S.C. 119(a) to Patent Application No. 10-2009-0070065 filed in the Republic of Korea on Jul. 30, 2009. The contents of all of these applications are hereby incorporated by reference as fully set forth herein in their entirety.

BACKGROUND OF THE INVENTION

Field of the Invention

The present invention relates to a wireless communication system, and more particularly, to a method for scheduling radio resources for uplink/downlink packet data transmission in a cellular wireless communication system capable of using multiple frequency bands, a structure of scheduling information, a scheme for transmitting the scheduling information, and an apparatus using the above-mentioned methods as well as the scheduling information structure.

Discussion of the Related Art

In a cellular orthogonal frequency division multiplexing (OFDM) wireless packet communication system, uplink/downlink data packet transmission is performed on a subframe basis and one subframe is defined by a certain time interval including a plurality of orthogonal frequency division multiplexing (OFDM) symbols.

3rd Generation Partnership Project Long Term Evolution (3GPP LTE) supports a type 1 radio frame structure applicable to frequency division duplex (FDD), and a type 2 radio frame structure applicable to time division duplex (TDD). For convenience of description, the term "radio frame" will be referred to as a frame. The structure of a type 1 radio frame is shown in FIG. 1. The type 1 radio frame includes 10 subframes, each of which consists of two slots. The structure of a type 2 radio frame is shown in FIG. 2. The type 2 radio frame includes two half-frames, each of which is made up of five subframes, a downlink piloting time slot (DwPTS), a guard period (GP), and an uplink piloting time slot (UpPTS), in which one subframe consists of two slots. That is, one subframe is composed of two slots irrespective of the radio frame type.

In the 3GPP LTE system, a signal transmitted from each downlink slot can be described by a resource grid including $N_{RB}^{DL}N_{SC}^{RB}$ subcarriers and $N_{symb}^{DL}$ OFDM symbols. Here, $N_{RB}^{DL}$ represents the number of resource blocks (RBs) in a downlink, $N_{SC}^{RB}$ represents the number of subcarriers constituting one RB, and $N_{symb}^{DL}$ represents the number of OFDM symbols in one downlink slot. The structure of this resource grid is shown in FIG. 3.

In the 3GPP LTE system, a signal transmitted from each uplink slot can be described by a resource grid including $N_{RB}^{UL}N_{SC}^{RB}$ subcarriers and $N_{symb}^{DL}$ Single Carrier-Frequency Division Multiple Access (SC-FDMA) symbols. Here, $N_{RB}^{UL}$ represents the number of resource blocks (RBs) in an uplink, $N_{SC}^{RB}$ represents the number of subcarriers constituting one RB, and $N_{symb}^{UL}$ represents the number of SC-FDMA symbols in one uplink slot. The structure of this resource grid is shown in FIG. 4.

Each element contained in the resource grid is called a resource element, and can be identified by an index pair (k,l) contained in a slot, where k is an index in a frequency domain, and l is an index in a time domain.

RBs may be used to describe a mapping relationship between physical channels and resource elements. The RBs may be differently defined in a physical region and a logical region. In this definition of RBs, the RBs can be divided into physical resource blocks (PRBs) in the physical region and virtual resource blocks (VRBs) in the logical or virtual region. The PRBs may be referred to as physical resource units (PRUs), and the VRBs may be referred to as logical resource units (LRUs). One PRB may be mapped to one VRB. A mapping relationship between the VRBs and the PRBs can be described on a subframe basis. In more detail, this mapping relationship can be described in units of each of slots constituting one subframe. Also, the mapping relationship between the VRBs and the PRBs can be described using a mapping relationship between indexes of the VRBs and indexes of PRBs. A detailed description of this will be further given in embodiments of the present invention. A PRB is defined by $N_{symb}^{DL}$ consecutive OFDM symbols in a time domain and $N_{SC}^{RB}$ consecutive subcarriers in a frequency domain. One PRB is therefore composed of $N_{symb}^{DL}N_{SC}^{RB}$ resource elements. The PRBs are assigned numbers from 0 to $N_{RB}^{DL}-1$ in the frequency domain.

A VRB can have the same size as that of the PRB. There are two types of VRBs defined, the first one being a localized type and the second one being a distributed type. For each VRB type, a pair of VRBs have a single VRB index (which may hereinafter be referred to as a 'VRB number') and are allocated over two slots of one subframe. In other words, $N_{RB}^{DL}$ VRBs belonging to a first one of two slots constituting one subframe are each assigned any one index of 0 to $N_{RB}^{DL}-1$, and $N_{RB}^{DL}$ VRBs belonging to a second one of the two slots are likewise each assigned any one index of 0 to $N_{RB}^{DL}-1$.

The index of a VRB corresponding to a specific virtual subcarrier of the first slot has the same value as that of the index of a VRB corresponding to the specific virtual subcarrier of the second slot. That is, assuming that a VRB corresponding to an ith virtual subcarrier of the first slot is denoted by VRB1(i), a VRB corresponding to a jth virtual subcarrier of the second slot is denoted by VRB2(j) and index numbers of the VRB1(i) and VRB2(j) are denoted by index(VRB1(i)) and index(VRB2(j)), respectively, a relationship of index(VRB1(k))=index(VRB2(k)) is established (see FIG. 5(a)).

Likewise, the index of a PRB corresponding to a specific physical subcarrier of the first slot has the same value as that of the index of a PRB corresponding to the specific physical subcarrier of the second slot. That is, assuming that a PRB corresponding to an ith physical subcarrier of the first slot is denoted by PRB1(i), a PRB corresponding to a jth physical subcarrier of the second slot is denoted by PRB2(j) and index numbers of the PRB1(i) and PRB2(j) are denoted by index(PRB1(i)) and index(PRB2(j)), respectively, a relationship of index(PRB1(k))=index(PRB2(k)) is established (see FIG. 5(b)).

Some of the aforementioned VRBs are allocated as the localized type and the others are allocated as the distributed type. Hereinafter, the VRBs allocated as the localized type will be referred to as 'localized virtual resource blocks (LVRBs)' and the VRBs allocated as the distributed type will be referred to as 'distributed virtual resource blocks (DVRBs)'.

The LVRB of index i corresponds to the PRB of index i. That is, an LVRB1 having the index i corresponds to a PRB1 having the index i, and an LVRB2 having the index i corresponds to a PRB2 having the index i (see FIG. 6). In this case, it is assumed that the VRBs of FIG. 6 are all allocated as LVRBs.

However, the distributed VRBs (DVRBs) may not be directly mapped to PRBs. That is, the indexes of the DVRBs can be mapped to the PRBs after being subjected to a series of processes.

First, the order of a sequence of consecutive indexes of the DVRBs can be interleaved by a block interleaver. Here, the sequence of consecutive indexes means that the index number is sequentially incremented by one beginning with 0. A sequence of indexes output from the block interleaver is sequentially mapped to a sequence of consecutive indexes of PRB1s (see FIG. 7). It is assumed that the VRBs of FIG. 7 are all allocated as DVRBs. On the other hand, the sequence of indexes output from the block interleaver is cyclically shifted by a predetermined number and the cyclically shifted index sequence is sequentially mapped to a sequence of consecutive indexes of PRB2s (see FIG. 8). It is assumed that the VRBs of FIG. 7 or FIG. 8 are all allocated as DVRBs. In this manner, PRB indexes and DVRB indexes can be mapped over two slots.

In this case, the block interleaver shown in FIG. 7 or in FIG. 8 may be omitted.

According to the above-mentioned processes of mapping DVBRs to PRBs, a PRB(i) and a PRB2(j) having the same index i can be mapped to a DVRB1(m) and a DVRB2(n) having different indexes m and n. For example, referring to FIG. 7 and FIG. 8, a PRB1(1) and a PRB2(1) are mapped to a DVRB1(6) and a DVRB2(9) having different indexes. A frequency diversity effect can be obtained based on this DVRB mapping scheme.

A variety of methods for allocating such VRBs may be used, for example, a bitmap method and a compact method. According to the bitmap method, resources can be freely allocated throughout the system band, and non-consecutive RBs can also be allocated. However, the above-mentioned bitmap method has a disadvantage in that it unavoidably increases the number of bits requested for allocation of RBs as the number of the RBs increases. According to the compact method, only one set of consecutive RBs can be assigned throughout the system band. In order to represent the consecutive RBs, a resource indication value (RIV) may be defined. This RIV may represent a combination of a start point (S) of the series of allocated RBs among all RBs and a length (L) of the series of allocated RBs. According to the number of generable combinations of the start point (S) and the length (L), the number of bits representing a certain RIV for indicating a specific combination is decided by the above compact method. Assuming that the number of bits representing this RIV can be reduced, the remaining bits may be used to transmit other information.

SUMMARY OF THE INVENTION

An object of the present invention devised to solve the problem lies in a method and apparatus for transmitting and receiving resource allocation information without using additional signaling overhead when the resources are allocated to a multi-band supporting UE (also called an advanced UE) used in a system such as an LTE Advanced (LTE-A) system, in which the resource allocation information cannot be indicated by an RIV allocated to a single-band supporting UE used in a conventional LTE system.

The object of the present invention can be achieved by providing a method for detecting a resource indication value (RIV) indicating not only a start index (S) of consecutive virtual resource blocks (VRBs) allocated to a first user equipment (UE) capable of simultaneously receiving information from a plurality of frequency bands, but also a length (L) of the consecutive VRBs, in a wireless mobile communication system capable of using the plurality of frequency bands, the method including, receiving, by the first UE, the RIV, and detecting the RIV, wherein the detected RIV is greater than the maximum value usable as an RIV allocated to a second UE capable of receiving information from only one frequency band.

In another aspect of the present invention, there is provided a UE for simultaneously receiving information from a plurality of frequency bands in a wireless mobile communication system capable of using the plurality of frequency bands, the UE including, a radio frequency (RF) module, and a processor electrically connected to the RF module, wherein the processor receives and detects a resource indication value (RIV), indicating not only a start index (S) of consecutive virtual resource blocks (VRBs) allocated to the UE but also a length (L) of the consecutive VRBs, through the RF module, where the detected RIV is greater than the maximum value usable as an RIV allocated to other UE capable of receiving information from only one frequency band.

In another aspect of the present invention, there is provided a method for transmitting a resource indication value (RIV) indicating not only a start index (S) of consecutive virtual resource blocks (VRBs) allocated to a first user equipment (UE) capable of simultaneously receiving information from a plurality of frequency bands, but also a length (L) of the consecutive VRBs, in a wireless mobile communication system capable of using the plurality of frequency bands, the method including, transmitting the RIV to the first UE by a base station, wherein the transmitted RIV is greater than the maximum value usable as an RIV allocated to a second UE capable of receiving information from only one frequency band.

In another aspect of the present invention, there is provided a base station for simultaneously transmitting information from a plurality of frequency bands in a wireless mobile communication system capable of using the plurality of frequency bands, the base station including, a radio frequency (RF) module, and a processor electrically connected to the RF module, wherein the processor transmits a resource indication value (RIV), indicating not only a start index (S) of consecutive virtual resource blocks (VRBs) allocated to a user equipment (UE) capable of simultaneously receiving information from the plurality of frequency bands but also a length (L) of the consecutive VRBs, through the RF module, where the transmitted RIV is greater than the maximum value usable as an RIV allocated to other UE capable of receiving information from only one frequency band.

A length of a binary bit field indicating the RIV detected by the first UE may be equal to the length of another binary bit field indicating the RIV allocated to the second UE.

The length (L) of the consecutive VRBs indicated by the detected RIV may be set to zero '0'.

The spacing between center frequencies of the plurality of frequency bands may be set to a multiple of 300 kHz, each of the frequency bands may include 100 resource blocks (RBs), one RB may include 12 subcarriers, and second subcarriers other than first subcarriers belonging to the 100 RBs among subcarriers belonging to each frequency band may be allocated only to the first UE.

The number of the frequency bands may be 2, and data may not be transmitted through a specific second subcarrier located at the center part of the second subcarriers located between the two frequency bands.

The second subcarriers may be grouped into one or more divided parts, each divided part may include N second subcarriers, and the RIV detected by the first UE may indicate a start position of divided parts allocated to the first UE and the number of the divided parts allocated to the first UE. The number (N) of the second subcarriers may be 12 (N=12).

In the above-mentioned present invention, the first UE may be a multi-band supporting UE (i.e., an advanced UE), and the second UE may be a single-band supporting UE (i.e., a legacy UE).

When resources are allocated to a multi-band supporting UE used in an LTE-A system, the present invention can transmit and receive resource allocation information without using additional signaling overhead, in which the resource allocation information cannot be indicated by an RIV allocated to a single-band supporting UE used in a conventional LTE system.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIG. 20 is a view illustrating an example of RIVs when the number (NRB) of available RBs is 20 according to one embodiment of the present invention.

DETAILED DESCRIPTION OF THE INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific details in order to provide a thorough understanding of the present invention. However, it will be apparent to those skilled in the art that the present invention may be practiced without such specific details. For example, the following description will be given centering upon a mobile communication system serving as a 3GPP LTE system, but the present invention is not limited thereto and the remaining parts of the present invention other than unique characteristics of the 3GPP LTE system are applicable to other mobile communication systems.

In some cases, in order to prevent ambiguity of the concepts of the present invention, conventional devices or apparatuses well known to those skilled in the art will be omitted and be denoted in the form of a block diagram on the basis of the important functions of the present invention. Wherever possible, the same reference numbers will be used throughout the drawings to refer to the same or like parts.

In the following description, a terminal may include mobile or fixed user equipments (UEs), for example, a user equipment (UE), a mobile station (MS) and the like, and may also be referred to in any of these ways as necessary. Also, the base station (BS) may include a Node B (Node-B) and an eNode B (eNode-B), and may also be referred to in any of these ways.

As an example of the mobile communication system applicable to the present invention, a 3GPP LTE communication system will hereinafter be described in detail.

Figure 1:
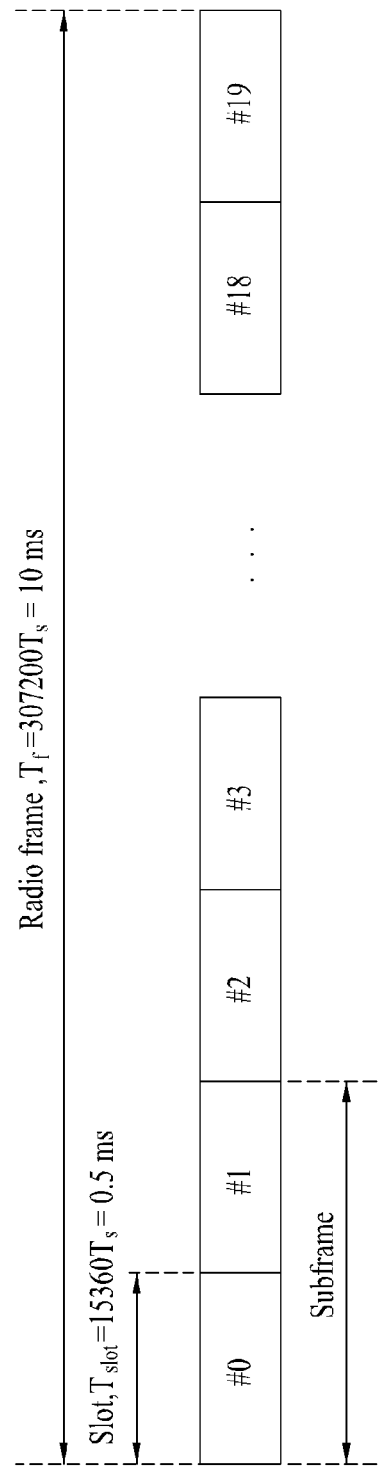
FIG. 1 is a view showing an example of an FDD-type radio frame structure used in a 3GPP LTE.
Figure 2:
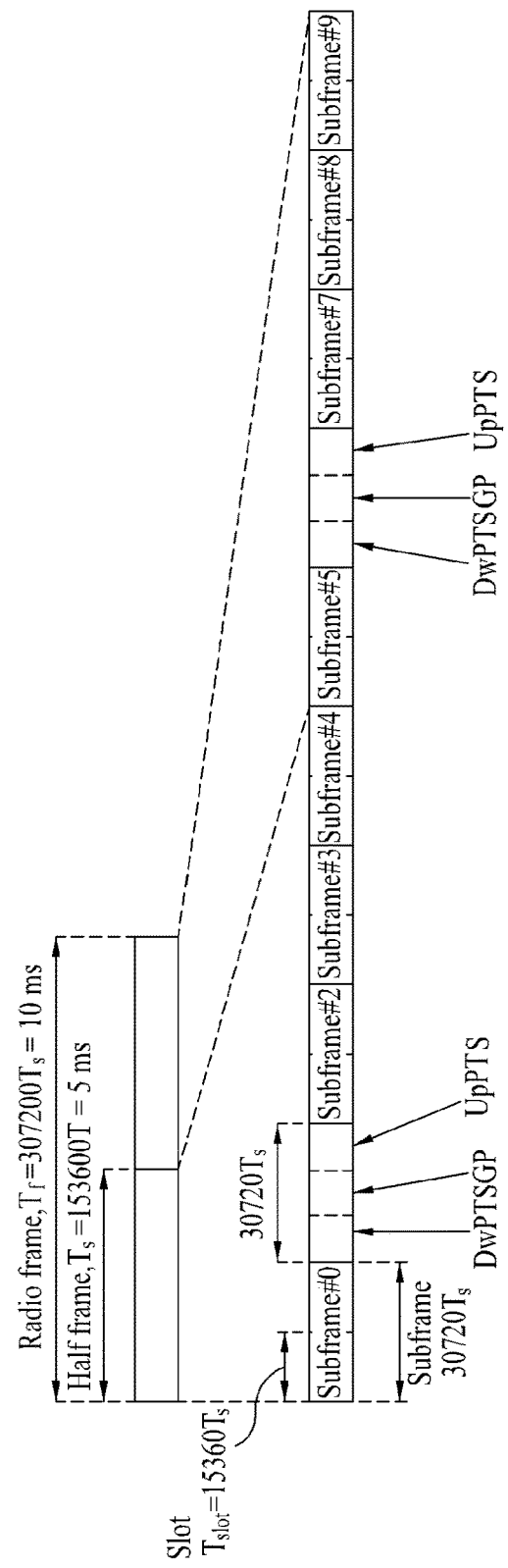
FIG. 2 is a view showing an example of a TDD-type radio frame structure used in a 3GPP LTE.
Figure 3:
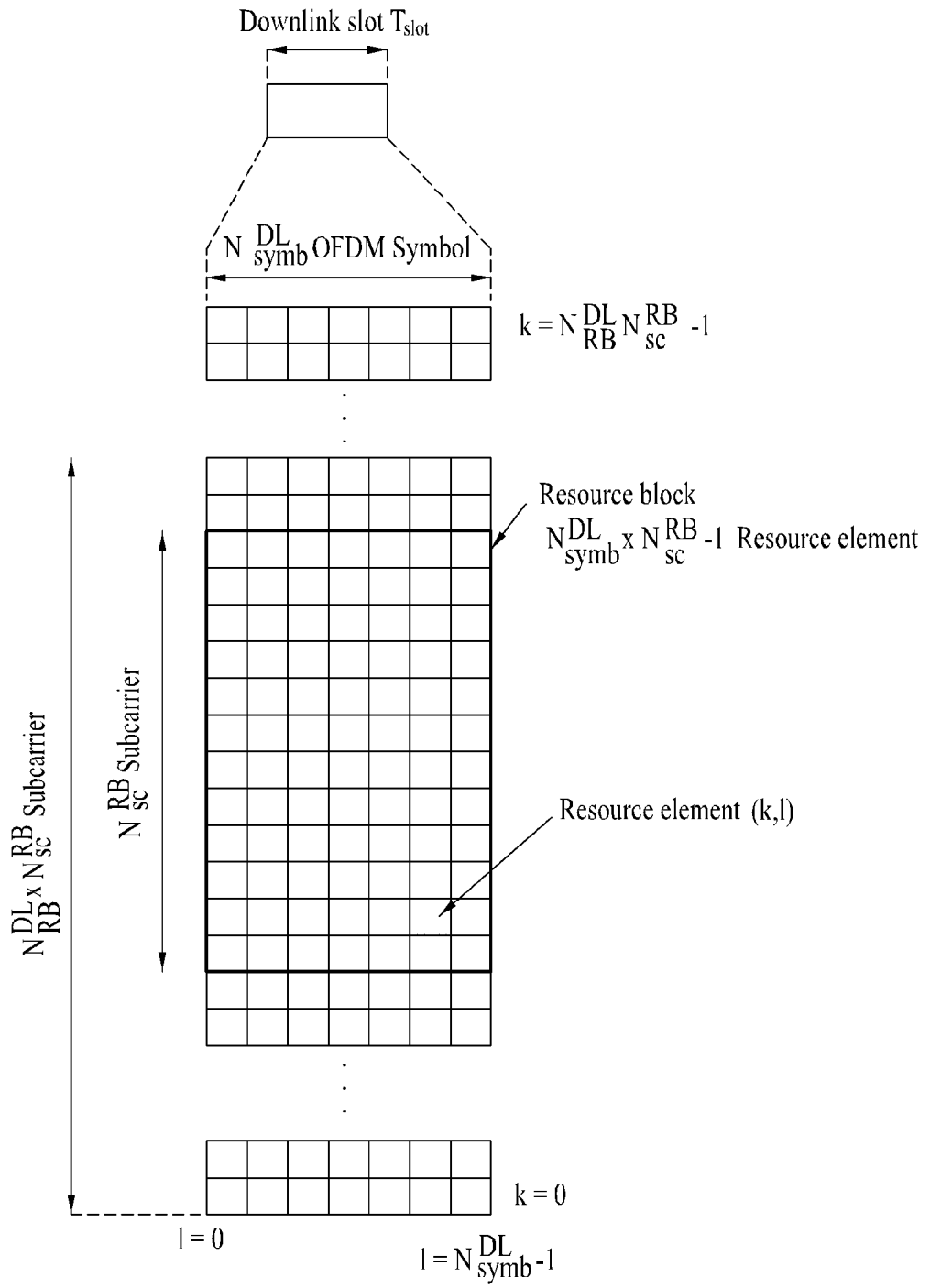
FIG. 3 is a view showing an example of a resource grid structure used for a downlink in a 3GPP LTE.
Figure 4:
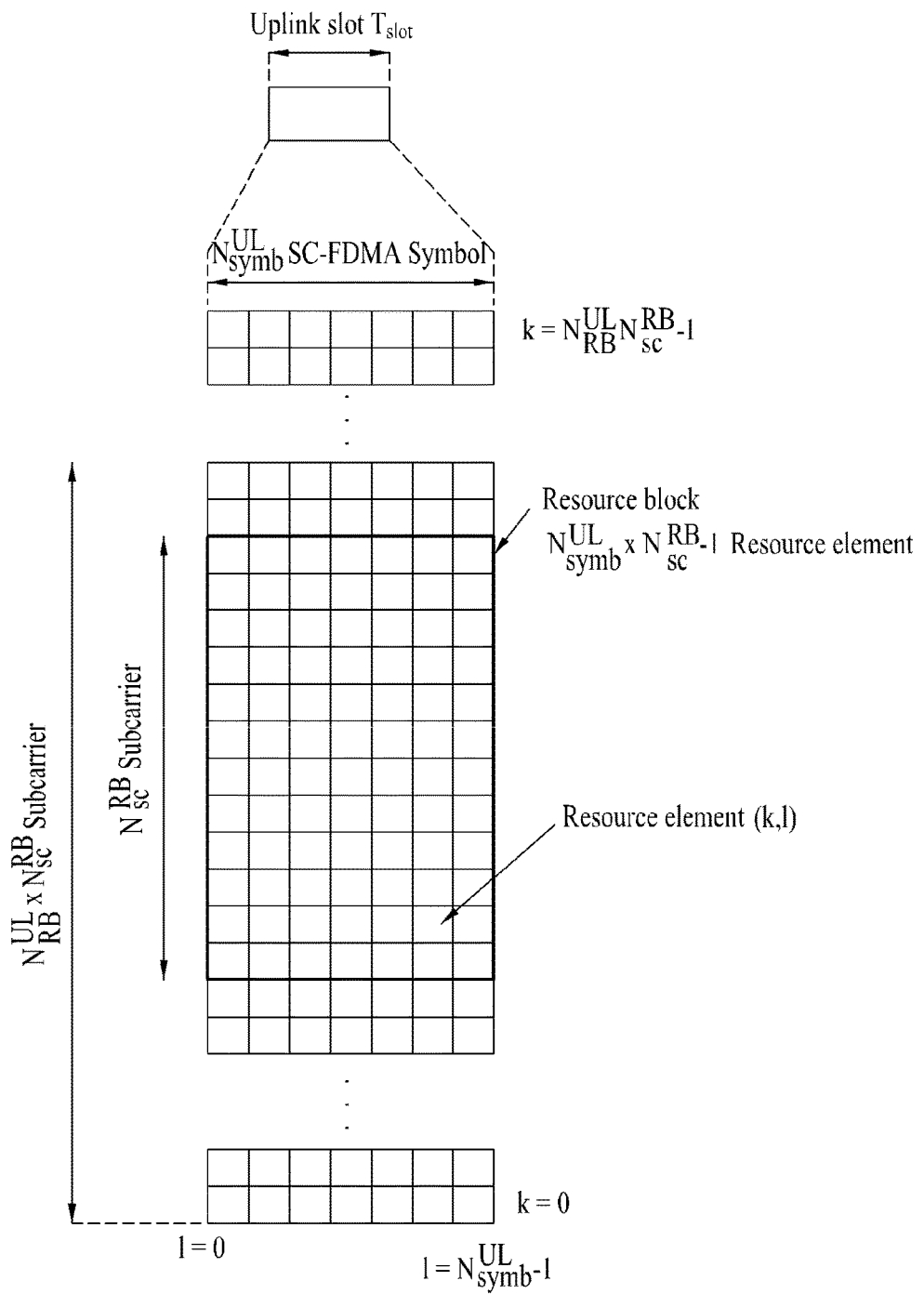
FIG. 4 is a view showing an example of a resource grid structure used for an uplink in a 3GPP LTE.
Figure 5:
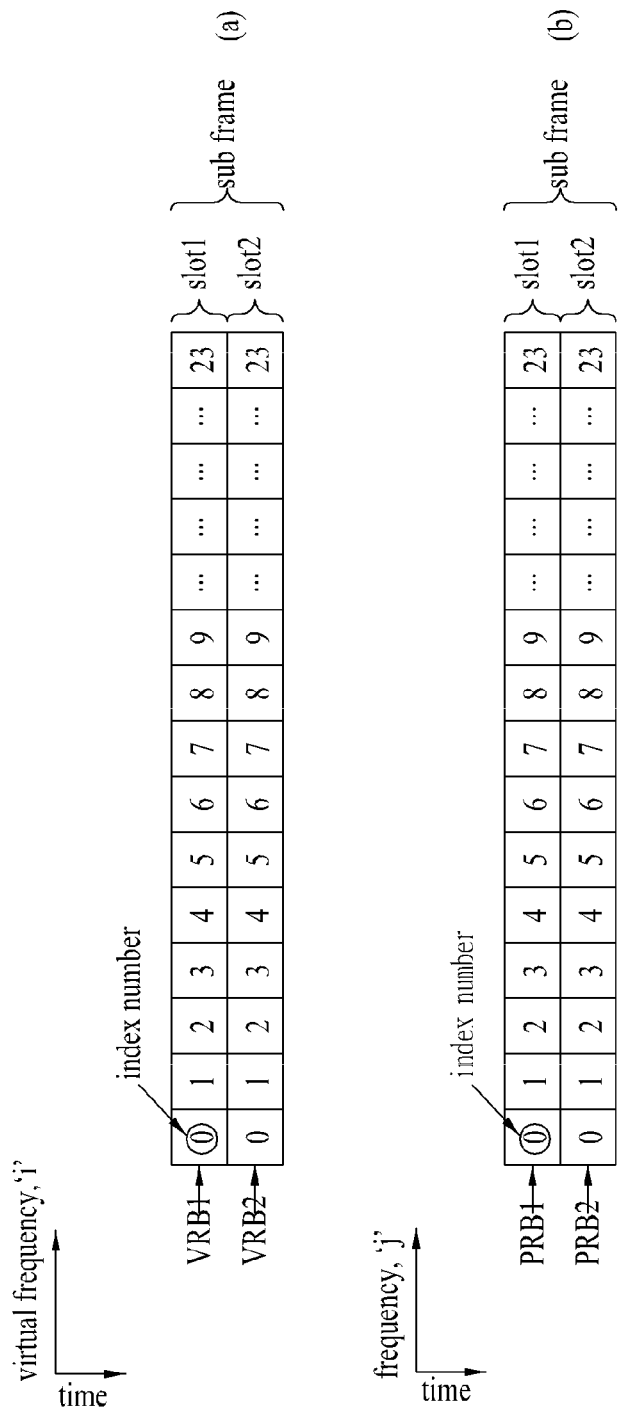
FIG. 5 is a conceptual diagram showing resource blocks (RBs) used in a 3GPP LTE.
Figure 6:
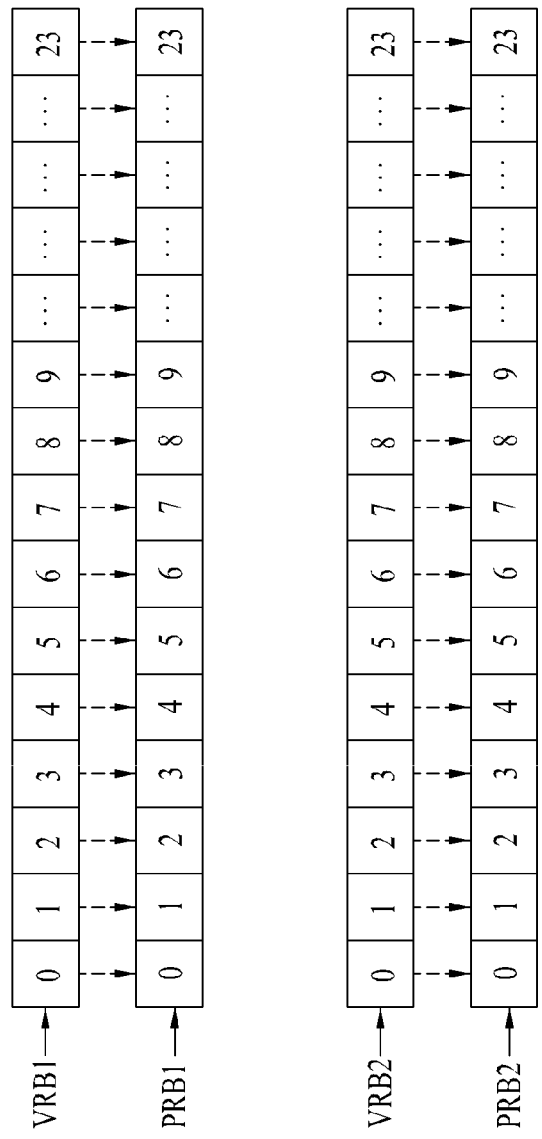
FIG. 6 is a view showing a method for mapping localized virtual resource blocks (LVRBs) to physical resource blocks (PRBs) in a 3GPP LTE.
Figure 7:
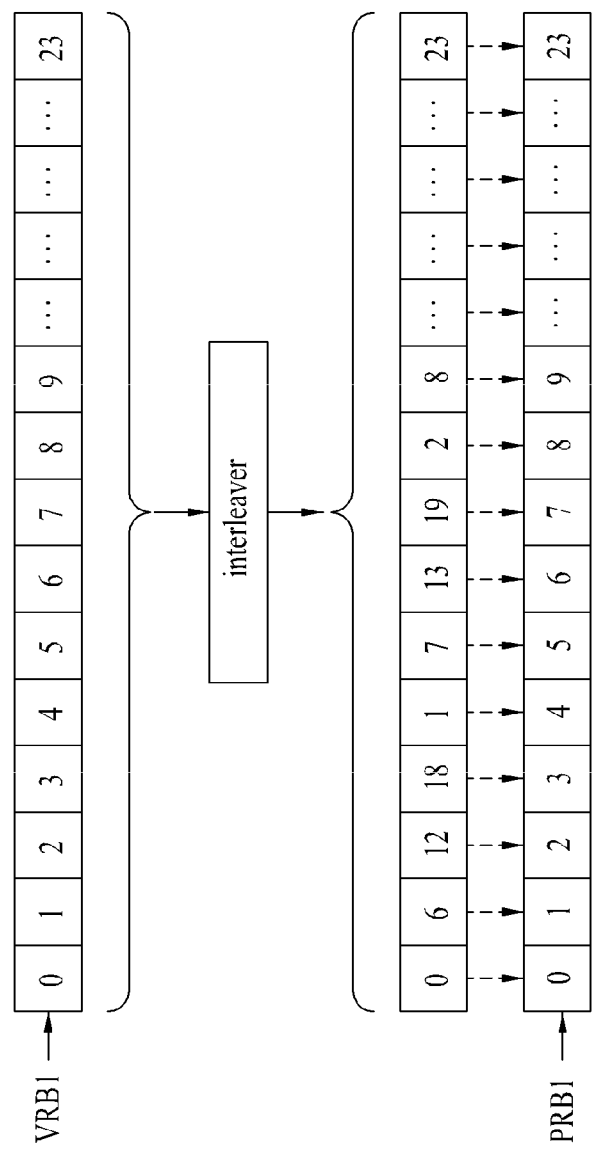
FIGS. 7 and 8 are views showing distributed virtual resource blocks (DVRBs) mapped to PRBs in a 3GPP LTE.
Figure 8:
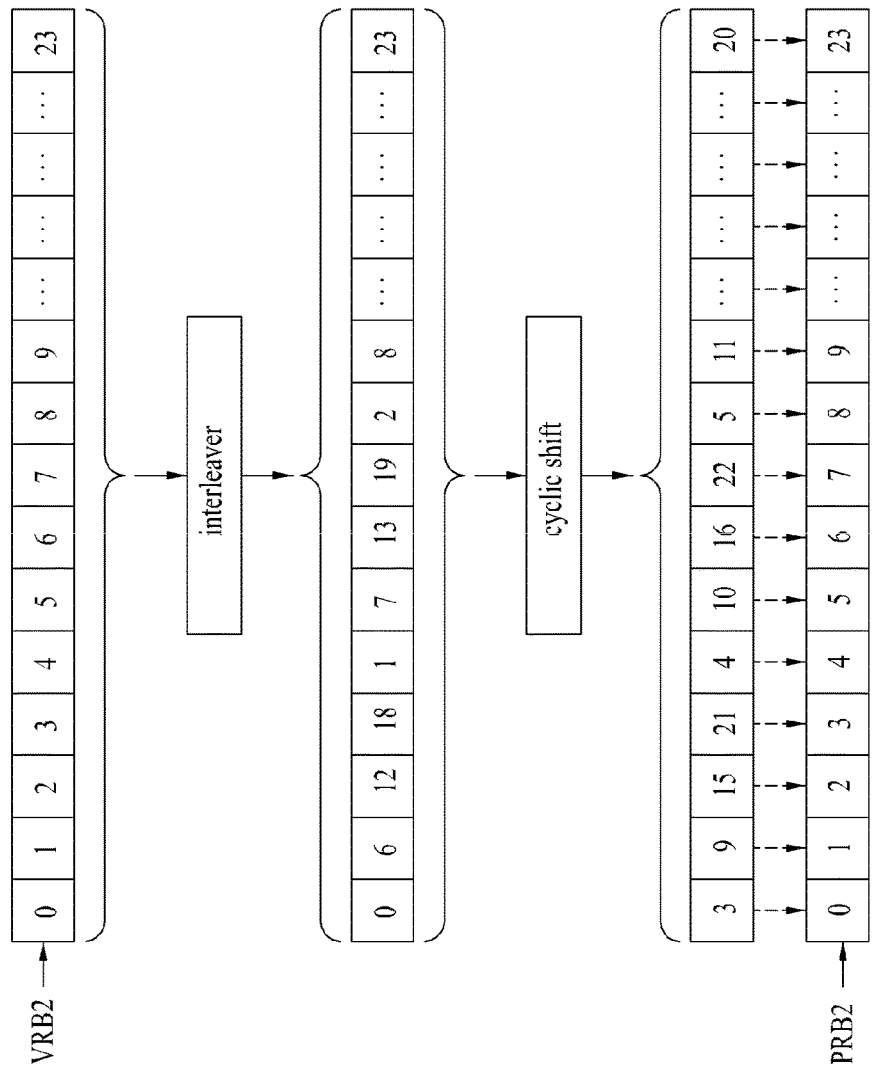
Figure 9:
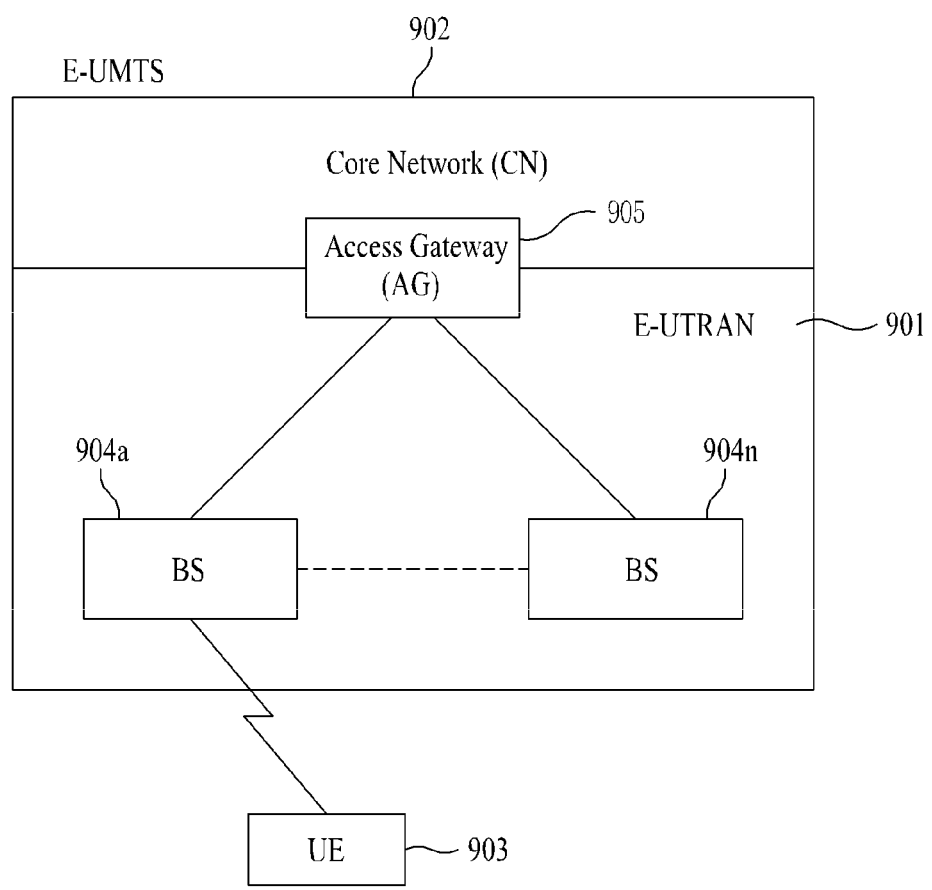
FIG. 9 is a block diagram illustrating an Evolved Universal Mobile Telecommunications System (E-UMTS) network structure as an example of a mobile communication system.

FIG. 9 shows an Evolved Universal Mobile Telecommunications System (E-UMTS) network structure serving as an example of a mobile communication system.

The E-UMTS system is an evolved version of the conventional Universal Mobile Telecommunications System (UMTS) system and basic standardization thereof is in progress under the 3rd Generation Partnership Project (3GPP). Generally, the E-UMTS is also referred to as a Long Term Evolution (LTE) system.

The E-UMTS network may be classified into an Evolved-UMTS Terrestrial Radio Access Network (E-UTRAN) 901 and a Core Network (CN) 902. The E-UTRAN includes a UE 903, a BS (eNB or eNode B) 904a, . . . , 904n, and an Access Gateway (AG) 905 which is located at an end of a network and is connected to an external network. The AG 905 can be divided into a part that handles processing of user traffic and a part that handles control traffic. Here, the AG part for processing new user traffic and the AG part for processing control traffic can communicate with each other using a new interface.

One or more cells may exist for one eNB. An interface for transmitting user traffic or control traffic can be used between eNBs. A Core Network (CN) 902 may include the AG 905 and a node or the like for user registration of the UE 903. An interface for discriminating between the E-UTRAN 901 and the CN 902 may be used.

Radio interface protocol layers between the UE and the network can be classified into an L1 layer (first layer), an L2 layer (second layer) and an L3 layer (third layer) on the basis of the lower three layers of the Open System Interconnection (OSI) reference model widely known in communication systems. A physical layer belonging to the L1 layer provides an information transfer service utilizing a physical channel. A Radio Resource Control (RRC) layer located at the L3 layer controls radio resources between the UE and the network. For this operation, RRC messages are exchanged between the UE and the network via the RRC layers. The RRC layers may be distributed among base stations (BSs) (904a, . . . , 904n) and network nodes, or may be located only at base stations (BSs) (904a, . . . , 904n) or the AG 905.

Figure 10:
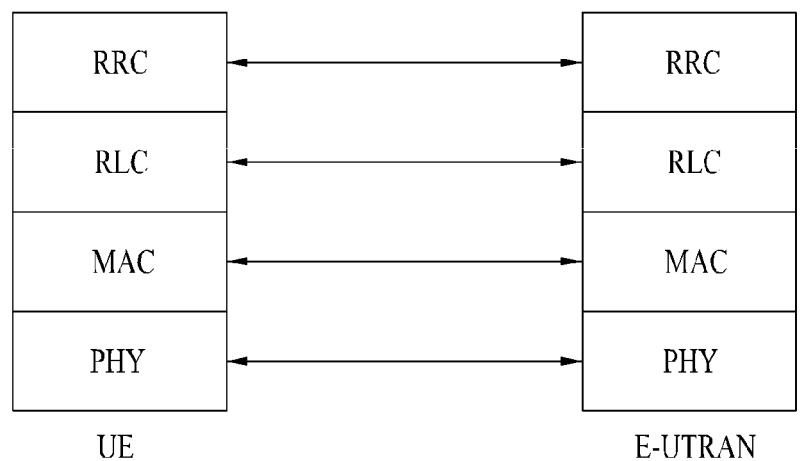
FIGS. 10 and 11 illustrate radio interface protocol structures between a UE and a UMTS Terrestrial Radio Access Network (UTRAN) that are based on a 3GPP radio access network standard.
Figure 11:
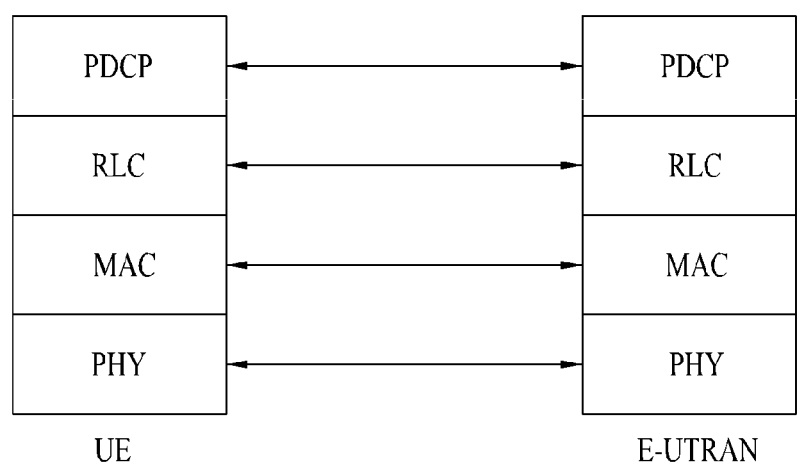

FIGS. 10 and 11 illustrate radio interface protocol structures between a UE and a UTRAN that are based on a 3GPP radio access network standard.

The radio interface protocol of FIG. 10 or FIG. 11 is divided horizontally into a physical layer, a data link layer and a network layer, and vertically into a user plane for transmitting data information and a control plane for transmitting a control signal such as a signaling message. In more detail, FIG. 10 shows individual layers of a radio protocol control plane and FIG. 11 shows individual layers of a radio protocol user plane. Protocol layers of FIGS. 10 and 11 can be classified into an L1 layer (first layer), an L2 layer (second layer) and an L3 layer (third layer) on the basis of the lower three layers of the OSI reference model widely known in communication systems.

The following is a detailed description of respective layers of the radio protocol control plane of FIG. 10 and the radio protocol user plane of FIG. 11.

The physical layer, which is the first layer, provides an information transfer service to an upper layer using a physical channel. The physical layer (PHY) is connected to a Medium Access Control (MAC) layer, located above the physical layer, through a transport channel. Data is transferred between the MAC layer and the physical layer through the transport channel. In this case, the transport channel is classified into a dedicated transport channel and a common transport channel according to whether or not a channel is shared. Data transfer between different physical layers, specifically between the respective physical layers of a transmitter and a receiver, is performed through the physical channel.

A variety of layers exist in the second layer (L2 layer). The MAC layer maps various logical channels to various transport channels, and performs logical-channel multiplexing for mapping various logical channels to one transport channel. The MAC layer is connected to the RLC layer serving as an upper layer through a logical channel. The logical channel can be classified into a control channel for transmitting information of a control plane and a traffic channel for transmitting information of a user plane according to categories of transmission information.

The RLC layer of the second layer performs segmentation and concatenation on data received from an upper layer, and adjusts the size of data to be suitable for a lower layer transmitting data to a radio interval. In order to guarantee various Qualities of Service (QoSs) requested by respective radio bearers (RBs), three operation modes, i.e., a Transparent Mode (TM), an Unacknowledged Mode (UM), and an Acknowledged Mode (AM), are provided. Specifically, an AM RLC performs a retransmission function using an Automatic Repeat and Request (ARQ) function so as to implement reliable data transmission.

A Packet Data Convergence Protocol (PDCP) layer of the second layer (L2) performs a header compression function to reduce the size of an IP packet header having relatively large and unnecessary control information in order to efficiently transmit IP packets such as IPv4 or IPv6 packets in a radio interval with a narrow bandwidth. As a result, only information required for a header part of data can be transmitted, so that transmission efficiency of the radio interval can be increased. In addition, in the LTE system, the PDCP layer performs a security function, this security function is composed of a ciphering function for preventing a third party from eavesdropping on data and an integrity protection function for preventing a third party from handling data.

A Radio Resource Control (RRC) layer located at the top of the third layer (L3) is defined only in the control plane and is responsible for control of logical, transport, and physical channels in association with configuration, re-configuration and release of Radio Bearers (RBs). The RB is a logical path that the first and second layers (L1 and L2) provide for data communication between the UE and the UTRAN. Generally, Radio Bearer (RB) configuration means that a radio protocol layer needed for providing a specific service, and channel characteristics are defined and their detailed parameters and operation methods are configured. The Radio Bearer (RB) is classified into a Signaling RB (SRB) and a Data RB (DRB). The SRB is used as a transmission passage of RRC messages in the C-plane, and the DRB is used as a transmission passage of user data in the U-plane.

A downlink transport channel for transmitting data from the network to the UE may be classified into a Broadcast Channel (BCH) for transmitting system information and a downlink Shared Channel (SCH) for transmitting user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages.

Downlink physical channels for transmitting information transferred to a downlink transport channel to a radio interval between the UE and the network are classified into a Physical Broadcast Channel (PBCH) for transmitting BCH information, a Physical Multicast Channel (PMCH) for transmitting MCH information, a Physical Downlink Shared Channel (PDSCH) for transmitting downlink SCH information, and a Physical Downlink Control Channel (PDCCH) (also called a DL L1/L2 control channel) for transmitting control information, such as DL/UL Scheduling Grant information, received from first and second layers (L1 and L2). In the meantime, uplink physical channels for transmitting information transferred to an uplink transport channel to a radio interval between the UE and the network are classified into a Physical Uplink Shared Channel (PUSCH) for transmitting uplink SCH information, a Physical Random Access Channel for transmitting RACH information, and a Physical Uplink Control Channel (PUCCH) for transmitting control information, such as HARQ ACK or NACK Scheduling Request (SR) and Channel Quality Indicator (CQI) report information, received from first and second layers (L1 and L2).

Figure 12:
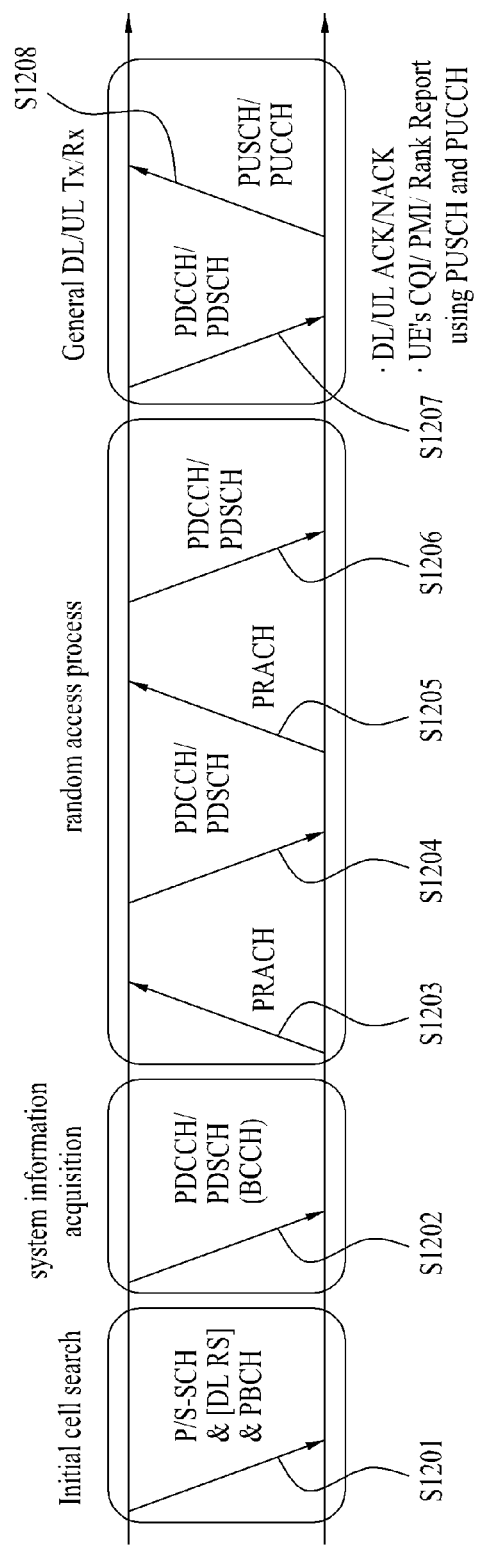
FIG. 12 shows physical channels used for a 3GPP LTE system serving as an example of a mobile communication system and a general signal transmission method capable of using the physical channels.

FIG. 12 shows physical channels used for a 3GPP LTE system serving as an example of a mobile communication system and a general signal transmission method capable of using the physical channels.

If a UE is re-powered on after being powered off or newly enters a cell region, the UE performs an initial cell search process, such as synchronization with a base station (BS), at step S1201. For the initial cell search process, the UE receives information of a Primary Synchronization Channel (P-SCH) and information of a Secondary Synchronization Channel (S-SCH) from the base station (BS), is synchronized with the BS, and is able to acquire information such as a cell ID or the like from the BS. After that, the UE receives information of a physical broadcast channel from the BS, such that it can acquire inter-cell broadcast information from the BS. In the meantime, the UE receives a downlink reference signal (DL RS) at the initial cell searching step, so that it can recognize a downlink channel status.

After performing the initial cell search process, the UE receives information of a Physical Downlink Control Channel (PDCCH) and information of a Physical Downlink Shared Control Channel (PDSCH) based on the PDCCH information, so that it can acquire more detailed system information at step S1202.

In the meantime, if a UE initially accesses the BS or has no resources for uplink transmission, the UE can perform a Random Access Procedure (RAP), such as steps S1203 to S1206, for the BS. For this operation, the UE transmits a specific sequence as a preamble through a Physical Random Access Channel (PRACH) at step S1203, and receives a response message to the random access through a PDCCH and a PDSCH at step S1204. In case of a competitive-based random access except for a handover case, a contention resolution procedure such as step S1205 or S1206 can then be carried out. At step S1205, information is transmitted through an additional PRACH. At step S1206, PDCCH/PDSCH information is received.

After performing the above-mentioned steps, as a procedure for transmitting UL/DL signals, the UE receives information of a PDCCH and a PDSCH at step S1207, and transmits information through a Physical Uplink Shared Channel (PUSCH) and a Physical Uplink Control Channel (PUCCH) at step S1208.

In the 3GPP LTE system, a signaling process for transmitting UL/DL signals is as follows.

Figure 13:
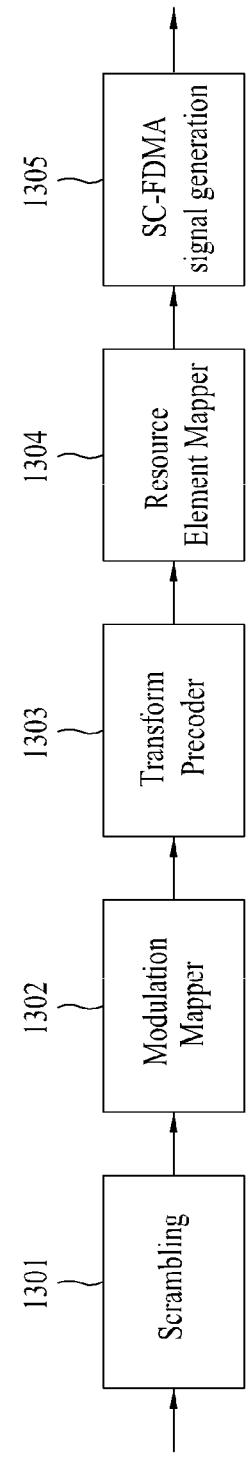
FIG. 13 is a conceptual diagram illustrating signal processing for enabling a UE to transmit an uplink signal.

FIG. 13 is a conceptual diagram illustrating signal processing for enabling a UE to transmit an uplink (UL) signal.

In order to transmit a UL signal, a scrambling module 1301 of the UE can scramble a transmission signal using a specific scrambling signal of the UE. The scrambled signal is input to a modulation mapper 1302, and is converted into a complex symbol using a BPSK-, QPSK-, or 16 QAM-scheme according to categories of the transmission signal and/or a channel status. After that, the modulated complex symbol is processed by a transform precoder 1301, and is then input to the resource element mapper 1304. The resource element mapper 1304 is able to map a complex symbol to a time-frequency element to be used for actual transmission. The processed signal may be transmitted to the base station (BS) via the SC-FDMA signal generator 1305.

Figure 14:
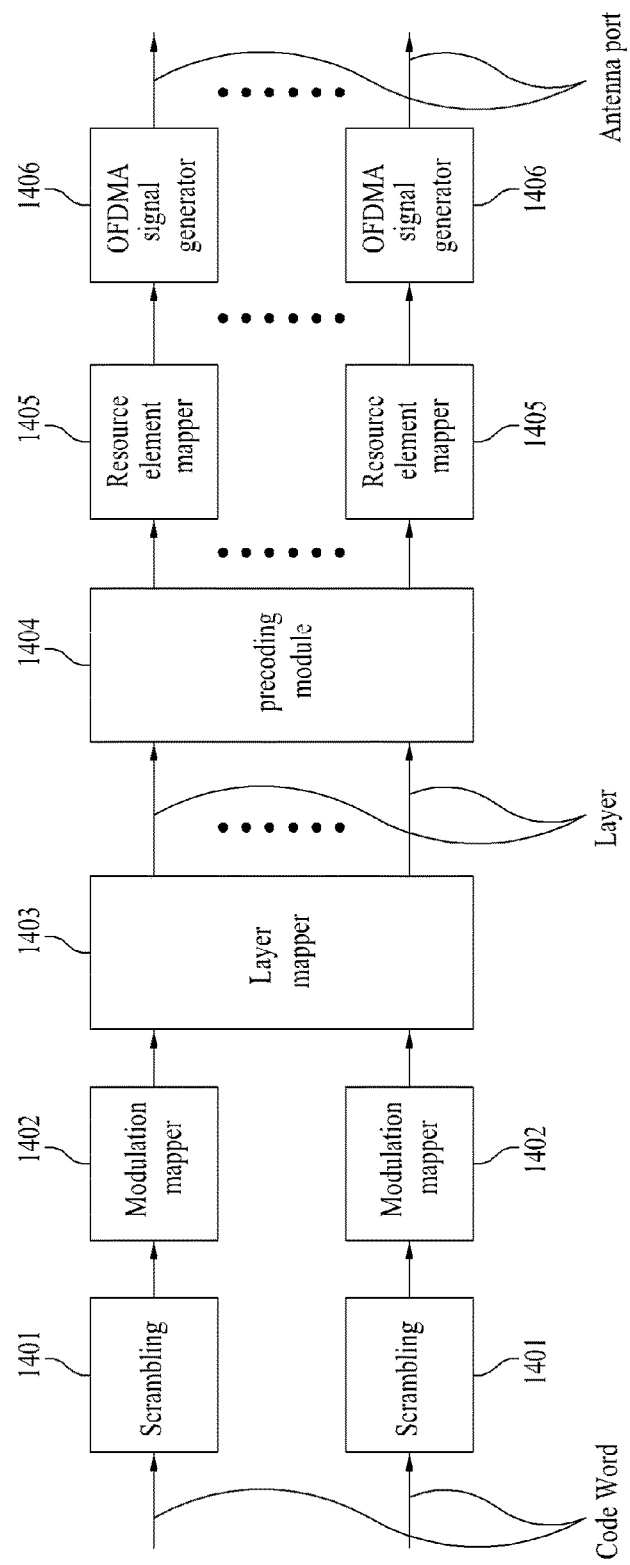
FIG. 14 is a conceptual diagram illustrating signal processing for enabling a base station (BS) to transmit a downlink signal.

FIG. 14 is a conceptual diagram illustrating signal processing for enabling the base station (BS) to transmit a downlink signal.

In the 3GPP LTE system, the BS is able to transmit one or more codewords via a downlink. Therefore, one or more codewords may be processed as complex symbols by the scrambling module 1401 and the modulation mapper 1402 in the same manner as in the uplink case of FIG. 13. Thereafter, the complex symbols are mapped to a plurality of layers by the layer mapper 1403, and each layer may be multiplied by a predetermined precoding matrix selected depending on a channel status and may then be allocated to each transmission antenna by the precoding module 1404. The processed transmission signal for each antenna is mapped to a time-frequency resource element to be used for transmission by the resource element mapper 1405. After that, the mapped result can be transmitted via each antenna after passing through the OFDM signal generator 1406.

In the case where a UE for use in a mobile communication system transmits an uplink signal, a Peak to Average Power Ratio (PAPR) may become more serious than in the case where the BS transmits a downlink signal. Thus, as described in FIGS. 13 and 14, the SC-FDMA scheme is used for uplink signal transmission in a different way from the OFDMA scheme used for downlink signal transmission.

In the 3GPP LTE system, the SC-FDMA scheme for uplink signal transmission and the OFDMA scheme for downlink signal transmission will hereinafter be described in detail.

Figure 15:
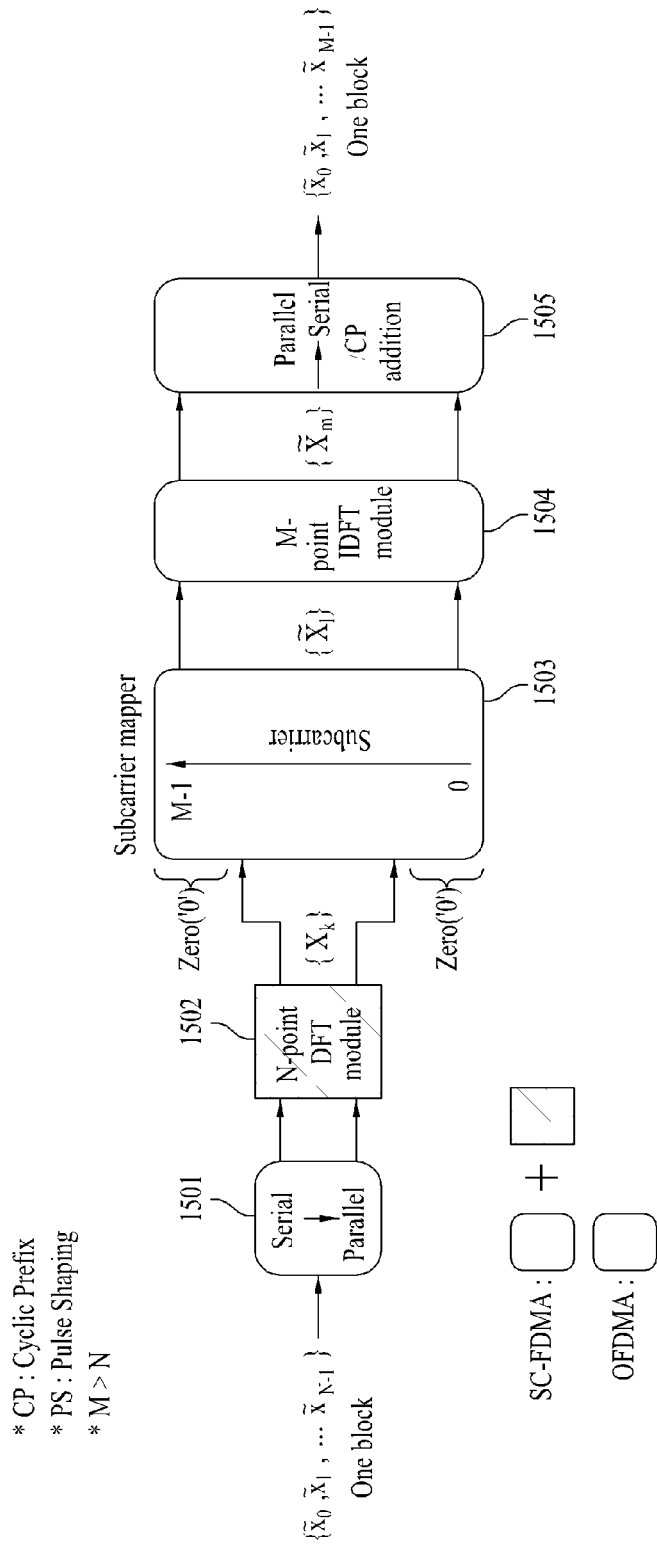
FIG. 15 is a conceptual diagram illustrating an SC-FDMA scheme for transmitting an uplink signal and an OFDMA scheme for transmitting a downlink signal in a mobile communication system.

FIG. 15 is a conceptual diagram illustrating the SC-FDMA scheme for uplink signal transmission and the OFDMA scheme for downlink signal transmission in a mobile communication system.

Referring to FIG. 15, not only a UE for transmitting an uplink signal but also a base station (BS) for transmitting a downlink signal includes a Serial-to-Parallel converter 1501, a subcarrier mapper 1503, an M-point IDFT module 1504, a Parallel-to-Serial converter 1505, and the like. However, a UE for transmitting a signal using the SC-FDMA scheme further includes an N-point DFT module 1502, and compensates for a predetermined part of the IDFT processing influence of the M-point IDFT module 1504 so that a transmission signal can have single carrier characteristics.

Hereinafter, terms used in the detailed description of this application are defined as follows.

A 'resource element (RE)' represents a smallest frequency-time unit in which data or a modulated symbol of a control channel is mapped. Provided that a signal is transmitted in one OFDM symbol over M subcarriers and N OFDM symbols are transmitted in one subframe, M–N REs are present in one subframe.

A 'physical resource block (PRB)' represents a unit frequency-time resource for data transmission. In general, one PRB includes a plurality of consecutive REs in a frequency-time domain, and a plurality of PRBs is defined in one subframe.

A 'virtual resource block (VRB)' represents a virtual unit resource for data transmission. In general, the number of REs included in one VRB is equal to the length of REs included in one PRB, and, when data is transmitted, one VRB can be mapped to one PRB or some areas of a plurality of PRBs.

A 'localized virtual resource block (LVRB)' is one type of the VRB. One LVRB is mapped to one PRB. LVRBs having different logical indexes are mapped to PRBs having different physical indexes. An LVRB may be interpreted in the same as a PRB.

A 'distributed virtual resource block (DVRB)' is another type of VRB. One DVRB is mapped to some REs in a plurality of PRBs, and REs to which different DVRBs are mapped are not duplicated.

Figure 16:
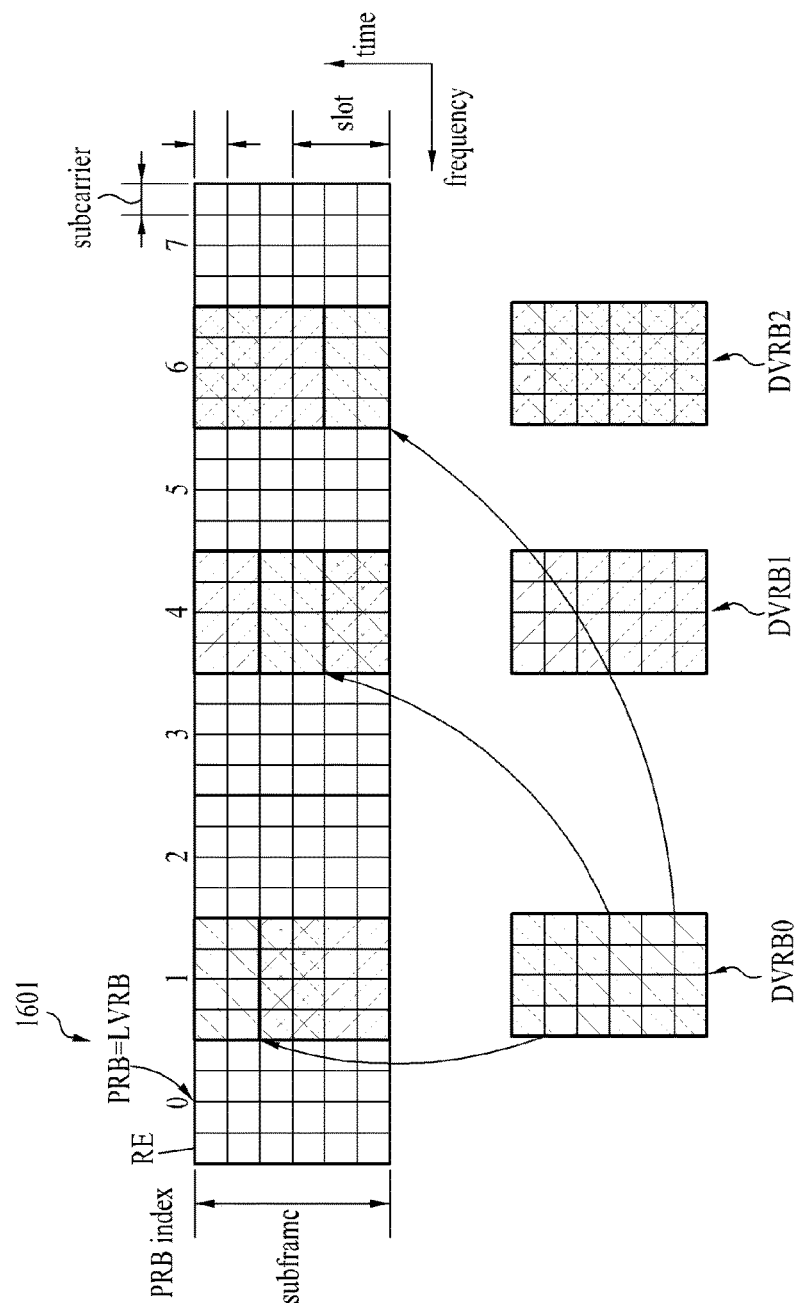
FIG. 16 is a view illustrating an example of a method for mapping DVRBs and LVRBs to PRBs.

'$N_D$'='$N_d$' represents the number of PRBs to which one DVRB is mapped. FIG. 16 illustrates an example of a method for mapping DVRBs and LVRBs to PRBs. In FIG. 16, $N_D$=3. As can be seen from FIG. 16, an arbitrary DVRB can be divided into three parts and the divided parts can be mapped to different PRBs, respectively. At this time, the remaining part of each PRB, not mapped by the arbitrary DVRB, is mapped to a divided part of another DVRB. The LTE system has a system structure denoted by '$N_D$'='$N_d$'=2.

'$N_{PRB}$' represents the number of PRBs in a system.

'$N_{LVRB}$' represents the number of LVRBs available in the system.

'$N_{DVRB}$' represents the number of DVRBs available in the system.

'$N_{LVRB\_UE}$' represents the maximum number of LVRBs allocable to one user equipment (UE).

'$N_{DVRB\_UE}$' represents the maximum number of DVRBs allocable to one UE.

'$N_{subset}$' represents the number of subsets.

Here, the "number of RBs" means the number of RBs divided on a frequency axis. That is, even in the case where RBs can be divided by slots constituting a subframe, the "number of RBs" means the number of RBs divided on the frequency axis of the same slot.

FIG. 16 shows an example of definitions of LVRBs and DVRBs.

As can be seen from FIG. 16, each RE of one LVRB is mapped one-to-one to each RE of one PRB. For example, one LVRB is mapped to a PRB0 (1601). In contrast, one DVRB is divided into three parts and the divided parts are mapped to different PRBs, respectively. For example, a DVRB0 is divided into three parts and the divided parts are mapped to a PRB1, PRB4 and PRB6, respectively. Likewise, a DVRB1 and a DVRB2 are each divided into three parts and the divided parts are mapped to the remaining resources of the PRB1, PRB4 and PRB6. Although each DVRB is divided into three parts in this example, the present invention is not limited thereto. For example, each DVRB may be divided into two parts.

Downlink data transmission from a base station (BS) to a specific terminal (i.e., a specific UE) or uplink data transmission from the specific UE to the base station (BS) is performed through one or more VRBs in one subframe. In other words, the above-mentioned data transmission may be achieved through PRBs corresponding to one or more VRBs. When the base station (BS) transmits data to the specific UE, it has to notify the terminal of which VRB will be used for data transmission. Also, in order to enable the specific UE to transmit data, the base station (BS) has to notify the terminal of which VRB will be used for data transmission. Specific information indicating how to map VRBs to PRBs can be predetermined, so that the UE can automatically recognize which PRB will be searched when acquiring information of VRBs allocated to the UE itself.

Data transmission schemes can be broadly classified into a frequency diversity scheduling (FDS) scheme and a frequency selective scheduling (FSS) scheme. The FDS scheme is a scheme that obtains a reception performance gain through frequency diversity, and the FSS scheme is a scheme that obtains a reception performance gain through frequency selective scheduling.

In the FDS scheme, a transmission stage transmits one data packet over subcarriers widely distributed in a system frequency domain so that symbols in the data packet can experience various radio channel fadings. Therefore, an improvement in reception performance is obtained by preventing the entire data packet from being subject to unfavorable fading. In contrast, in the FSS scheme, an improvement in reception performance is obtained by transmitting the data packet over one or more consecutive frequency areas in the system frequency domain which are in a favorable fading state. In a cellular OFDM wireless packet communication system, a plurality of terminals is present in one cell. At this time, because the radio channel conditions of the respective terminals have different characteristics, it is necessary to perform data transmission using the FDS scheme with respect to a certain UE and data transmission using the FSS scheme with respect to a different UE even within one subframe. As a result, a detailed FDS transmission scheme and a detailed FSS transmission scheme must be designed such that the two schemes can be efficiently multiplexed within one subframe. On the other hand, in the FSS scheme, a gain can be obtained by selectively using a band favorable to a UE among all available bands. In contrast, in the FDS scheme, a comparison is not made as to whether a specific band is good or bad, and, as long as a frequency interval capable of adequately obtaining diversity is maintained, there is no need to select and transmit a specific frequency band. Accordingly, it is advantageous in terms of improvement in overall system performance to perform the frequency selective scheduling of the FSS scheme preferentially when scheduling.

In the FSS scheme, because data is transmitted using subcarriers consecutively contiguous in the frequency domain, it is preferable that the data be transmitted using LVRBs. At this time, provided that $N_{PRB}$ PRBs are present in one subframe and a maximum of $N_{LVRB}$ LVRBs are available within the system, the base station can transmit bitmap information of $N_{LVRB}$ bits to each terminal to notify the terminal through which one of the LVRBs downlink data will be transmitted or through which one of the LVRBs uplink data can be transmitted. That is, each bit of the $N_{LVRB}$-bit bitmap information, which is transmitted to each terminal as scheduling information, indicates whether data will or can be transmitted through an LVRB corresponding to this bit, among the $N_{LVRB}$ LVRBs. This scheme is disadvantageous in that, when the number $N_{LVRB}$ becomes larger, the number of bits to be transmitted to each terminal becomes larger in proportion thereto.

In the meantime, physical downlink control channel (PD-CCH) downlink control information (DCI) transferred to a UE may have a plurality of formats. A resource allocation field transferred over the PDCCH may have different structures according to DCI formats. Thus, the user equipment (UE) may interpret the resource allocation field according to a format of the received DCI.

The resource allocation field may have two parts, i.e., resource block allocation information and a resource allocation header field. A plurality of resource allocation types may be defined. For example, according to a first resource allocation type, the resource block allocation information may have a bitmap indicating one set of consecutive physical resource blocks (PRBs). In this case, one bit may be allocated to one resource block group (RBG). According to a second resource allocation type, resource block allocation information may have a bitmap indicating subsets or RBs allocated to the UE. According to a third resource allocation type, resource block allocation information may have a bitmap indicating consecutively allocated VRBs. At this time, the resource allocation field may include a resource indication value (RIV) indicating a start resource block and the length of consecutively-allocated resource blocks (RBs). Examples of the above-mentioned resource allocation types have been disclosed in the 3GPP TS 36.213 document.

For example, a DCI format 1A prescribed in 3GPP TS 36.213 may be used for compact scheduling of one physical downlink shared channel (PDSCH) codeword. This compact scheduling is a scheduling scheme for allocating one set of consecutive VRBs to a UE, and corresponds to the above third resource allocation type. Hereinafter, the above-mentioned compact scheduling in the present invention may be referred to as a compact scheme.

As described above, provided that a terminal (i.e., the UE) may be assigned only one set of contiguous RBs, information of the assigned RBs may be represented by the compact scheme denoted by both a start point of RBs and the number of the RBs.

Figure 17:
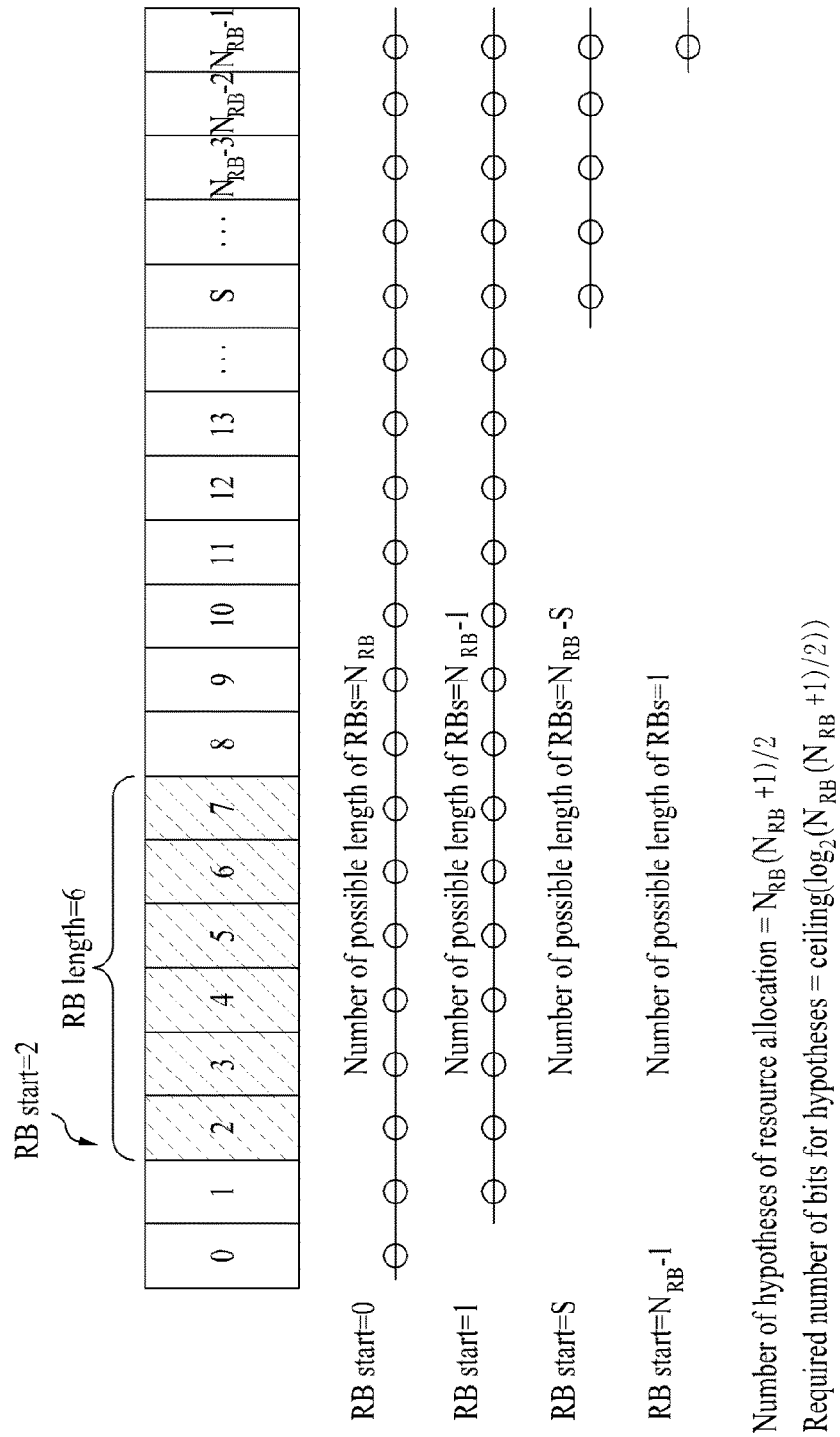
FIG. 17 is a view illustrating an example of a method for allocating resource blocks (RBs) by a compact scheme.

FIG. 17 is a view illustrating an example of a method for allocating resource blocks by a compact scheme. If the number of available RBs is denoted by $N_{RB}=N_{VRB}$, the length of available RBs varies depending on respective start points as shown in FIG. 17, such that the number of combinations for RB allocation is $N_{LVRB}(N_{LVRB}+1)/2$. Accordingly, the number of bits required for the combinations is 'ceiling(log 2($N_{LVRB}(N_{LVRB}+1)/2$))'. Here, ceiling (x) means rounding "x" up to the nearest integer. This method is advantageous over the bitmap scheme in that the number of bits does not significantly increase with the increase in the number $N_{LVRB}$.

On the other hand, for a method for notifying a UE of DVRB allocation, it is necessary to reserve the positions of respective divided parts of DVRBs distributively transmitted for a diversity gain. Alternatively, additional information may be required to directly notify the positions. Preferably, provided that the number of bits for signaling for the DVRBs is set to be equal to the number of bits in LVRB transmission of the above-stated compact scheme, it is possible to simplify a signaling bit format in a downlink. As a result, there are advantages that the same channel coding can be used, etc.

Here, in the case where one UE is allocated a plurality of DVRBs, this UE is notified of a DVRB index of a start point of the DVRBs, a length (=the number of the allocated DVRBs), and a relative position difference between divided parts of each DVRB (e.g., a gap between the divided parts).

Figure 18:
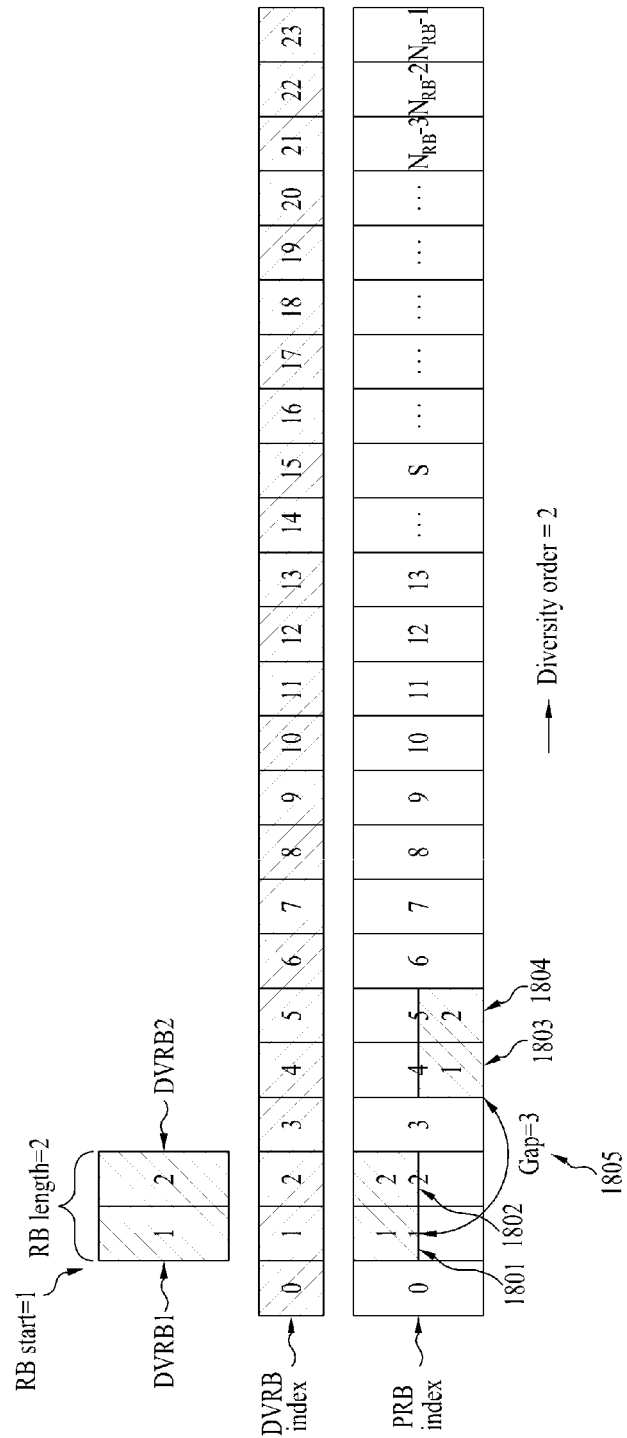
FIG. 18 is a view illustrating an example of a method for mapping two DVRBs having consecutive indexes to a plurality of contiguous PRBs.

FIG. 18 illustrates an example of a method for mapping two DVRBs having consecutive indexes to a plurality of contiguous PRBs.

As shown in FIG. 18, in the case where a plurality of DVRBs having consecutive indexes are mapped to a plurality of contiguous PRBs, first divided parts 1801 and 1802 and second divided parts 1803 and 1804 are spaced apart from each other by a gap 1805, while divided parts belonging to each of the upper divided parts and lower divided parts are contiguous to each other, so that the diversity order becomes 2. In this case, frequency diversity can be obtained only by a gap. In FIG. 18, $N_D=N_d=2$.

Figure 19:
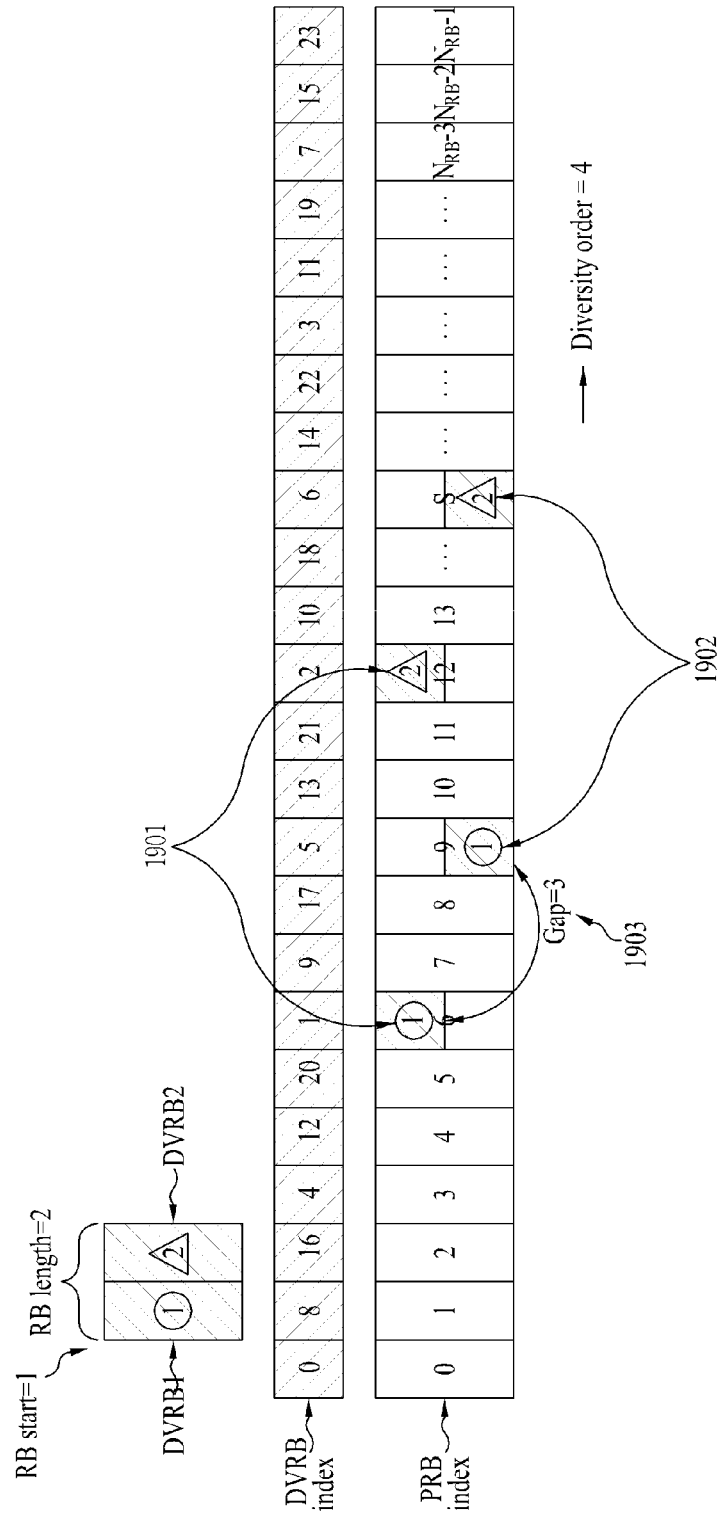
FIG. 19 is a view illustrating an example of a method for mapping two DVRBs having consecutive indexes to a plurality of spaced PRBs.

FIG. 19 illustrates an example of a method for mapping two DVRBs having consecutive indexes to a plurality of spaced PRBs.

In the method of FIG. 19, DVRB indexes are constructed as shown in FIG. 19. When mapping DVRBs to PRBs, consecutive DVRB indexes may be distributed without being mapped to contiguous PRBs. For example, a DVRB index '0' and a DVRB index '1' are not arranged contiguous to each other. In other words, in FIG. 19, DVRB indexes are arranged in the order of 0, 8, 16, 4, 12, 20, . . . , and this arrangement can be obtained by inputting the consecutive indexes to a block interleaver. In this case, it is possible to obtain distribution within each of the divided parts 1901 and 1902, as well as distribution by a gap 1903. Therefore, when a UE is allocated two DVRBs as shown in FIG. 19, the diversity order increases to 4, resulting in an advantage that an additional diversity gain can be obtained. In FIG. 19, $N_D=N_d=2$.

At this time, the value of the gap indicative of the relative position difference between the divided parts can be expressed in two ways. Firstly, the gap value can be expressed by a difference between DVRB indexes. Secondly, the gap value can be expressed by a difference between indexes of PRBs to which a DVRB is mapped. In the case of FIG. 19, Gap=1 in the first way, while Gap=3 in the second way. FIG. 19 shows the latter case 1903. Meanwhile, if the total number of RBs of the system is changed, the DVRB index arrangement may be changed accordingly. In this case, the use of the second way has the advantage of recognizing a physical distance between the divided parts.

In order to perform signaling of DVRB allocation, the above-mentioned LVRB compact scheme may be used. That is, if the compact scheme is applied to DVRBs signaled for one UE, PRBs mapped to the DVRBs may be distributed in a physical frequency domain, but these DVRBs have consecutive logical indexes in a virtual region (i.e., a logical region). In this case, a start point of consecutively-allocated RBs and length information of the RBs correspond to a start point of VRB indexes instead of PRB indexes and length information thereof, respectively.

As described above, in the compact scheme, LVRB signaling includes a start point of RBs and length information of the RBs. In order to perform the DVRB signaling, gap information may be additionally required in some cases. In order to constantly maintain the number of bits required for the entire signaling, there is a need to limit the length information such that an amount of information must be reduced. For example, when using 50 RBs or more, one bit of the RIV field must be assigned for gap indication, such that there is a need to reduce the number of bits required for transferring the RIV with the limitation in the length information.

On the other hand, in case of using RBs to perform the common signaling for several users, control signaling for notifying allocated RBs must allow all users present in a cell to read information of the allocated RBs. Thus, for this control signaling, a code rate may be reduced or a transmission power may be increased, such that the resultant control signaling information having a low code rate and a high transmission power may be transferred to several users. In order to reduce the code rate of the control signaling to which limited resources are allocated, an amount of control data must be reduced. In order to reduce the amount of control data, the number of bits required for RB allocation information must be reduced.

Likewise, control message data transferred to allocated RBs must allow all users present in the cell to read corresponding information, such that the control message data is transferred at a low code rate. Assuming that the code rate is 1/20, if an amount of data increases by 16 bits, an amount of codeword made after channel coding increases by 320 bits. In 3GPP Long Term Evolution (LTE), assuming that one TX antenna transmission (i.e., 1 Tx antenna transmission) is carried out and one OFDM symbol is used for a control signal, the number of symbols capable of transferring payload data within one RB (i.e., 1 RB) is 148. Thus, assuming that a quadrature phase shift keying (QPSK) modulation is used, the number of transferable bits is 296. As a result, data increases by 16 bits, and data increases by 320 bits, such that two RBs are additionally needed.

That is, in order to maintain a low code rate, although the size of data increases slightly, the number of RBs required for transferring this data greatly increases, such that RBs need to be allocated with a granularity of one RB unit (i.e., a 1 RB-based granularity).

Hereinafter, a resource allocation signaling structure for establishing a step for limiting a start position with a granularity of one-RB allocation (i.e., 1 RB allocation) will be described in detail.

The following equation 1 shows an exemplary signaling method based on the compact scheme which notifies of a start point (S) of RBs and the number (=Length, L) of allocated RBs.

[Equation 1]

if $L - 1 \leq \lfloor N_{RB} / 2 \rfloor$ then
$\quad RIV = N_{RB}(L - 1) + S$
else
$\quad RIV = N_{RB}(N_{RB} - L + 1) + (N_{RB} - 1 - S)$
End
Required bits
$N_{bit\_required} = \lceil \log_2(RIV_{max} + 1) \rceil$
Without limitation
$\quad RIV_{max} = N_{RB} \cdot (N_{RB} + 1) / 2 - 1$
With limitation $L^{Limit}$
$\quad RIV_{max} = \min\{N_{RB} \cdot (N_{RB} + 1) / 2 - 1, N_{RB} \cdot (L^{Limit} - 1) + N_{RB} - L^{Limit}\}$ In the following description, "mod(x,y)" means "x mod y", and "mod" means a modulo operation. Also, "$\lfloor \cdot \rfloor$" means a descending operation, and represents a largest one of integers equal to or smaller than a numeral indicated in "$\lfloor \; \rfloor$". On the other hand, "$\lceil \cdot \rceil$" means an ascending operation, and represents a smallest one of integers equal to or larger than a numeral indicated in "$\lceil \; \rceil$". Also, "round(•)" represents an integer nearest to a numeral indicated in "( )". "min(x,y)" represents a smaller value selected between x and y, whereas "max(x,y)" represents a larger value selected between x and y.

Assuming that the total number of available RBs is denoted by $N_{RB}$ and the beginning number of indexes to be assigned to the RBs is set to 0, indexes from 0 to $N_{RB}-1$ are sequentially assigned to the RBs. In this case, $N_{RB}$ may be the total number of all RBs contained in a system band, the number of all RBs used as VRBs, or the number of RBs contained in any limited area.

Thus, the range of S may be $0 \leq S \leq N_{RB}-1$, and the range of allocable 'L' values is changed according to this S value. In another view, the L value is in the range of $1 \leq L \leq N_{RB}$, and the range of available S values is changed according to the L value. Namely, a certain S value is unable to be combined with a specific L value.

A maximum value of each of the S and L values may be represented by a binary number irrespective of such impossible combinations. A bit field for this binary number may be constructed for each of the S and L values. In case of transmitting each of the bit fields, if $N_{RB}$ is 20 (i.e., $N_{RB}=20$), 20 is less than $2^5$ (i.e., $20<2^5$), so that 5 bits for the S value and 5 bits for the L values, namely, a total of 10 bits, are needed. However, these 10 bits include information of useless combinations incapable of being actually generated, such that overhead of unnecessary transmission bits is generated. Thus, the number of transmission bits can be reduced if each combination of generable S and L values is represented by 'RIV', this RIV is converted into a binary number according to binary representation, and the resultant RIV of the binary number is then transferred.

FIG. 20 is a view illustrating an example of RIVs when $N_{RB}=20$.

As can be seen from FIG. 20, 'RIV' is decided according to S and L values. In case of calculating 'RIV' related to $0 \leq S \leq N_{RB}-1$ in each of all L values using Equation 1, RIVs of FIG. 20 are formed. The value of each element shown in FIG. 20 is 'RIV' indicating a combination of S and L values corresponding to the above element. Values contained in a left upper part covering almost half of FIG. 20 correspond to combinations of generable S and L values if $N_{RB}=20$, and values contained in a right lower part colored in gray, covering the other half of FIG. 20, correspond to combinations of S and L values incapable of being generated.

In this scheme, RIVs present in the gray-colored part under the condition of $L-1 \leq \lfloor N_{RB}/2 \rfloor$, are mapped to RIVs under the other condition of $L-1 > \lfloor N_{RB}/2 \rfloor$, such that no RIVs are wasted. For example, if $N_{RB}$ is set to 20 (i.e., $N_{RB}=20$), RIVs present in a specific part corresponding to $L<\lfloor N_{RB}/2 \rfloor+1=\lfloor 20/2 \rfloor+1=11$ among the right lower part of FIG. 12 are reused in another part corresponding to $L>\lfloor N_{RB}/2 \rfloor+1=\lfloor 20/2 \rfloor+1=11$ among the left upper part of FIG. 20. In this case, a maximum value (i.e., a maximum RIV) among RIVs present in the left upper end is 209.

In this scheme, the maximum RIV may influence the number of transmission bits, RIVs below the maximum RIV may not be mapped to values incapable of being obtained by combinations of actual S and L values. That is, all values below the maximum RIV correspond to combinations of generable S and L values.

In case of separately transmitting the S value, a maximum S value is 19, such that 5 bits are needed to indicate this S value '19' (where $0 \leq 19 < 2^5$). In case of separately transmitting the L value, a maximum L value is 20, such that 5 bits are needed to indicate this L value '20' (where $0 \leq 20 < 2^5$). Therefore, in case of transmitting the S and L values independent of each other, 10 bits are needed in the end. However, the RIVs are in the range of $0 \leq RIV \leq 209 < 2^8$, such that 8 bits are needed to indicate these RIVs, as denoted by $N_{bit\_required}=8$. As a result, it can be recognized that 2 bits are saved as compared to the above case of transmitting the S and L values independent of each other. In this case, a valid RIV is 209 and a maximum value capable of being indicated by 8 bits is 255, so that a total of 46 values of 210~255 are not actually used.

In the meantime, in the above-mentioned RIV construction method, if a maximum value (=$L^{limit}$) of allocable RBs is limited, i.e., if the L value is limited to $L^{limit}$ or less, the number of required bits may be reduced.

In FIG. 20, if $L^{limit}$ is set to 6 (i.e., $L^{limit}$=6), the range of generable L values is given as 1≤L≤6, and combinations having other L values in the range of 7≤L≤20 are not used. At this time, it can be recognized that a maximum RIV among RIVs is 114. That is, the range of generable RIVs is given as 0≤RIV≤114<$2^7$, so that the number of required bits is 7 as denoted by $N_{bit\_required}$=7. In this case, a valid maximum RIV is 114 and a maximum value capable of being indicated by 7 bits is 127, so that a total of 13 values of 115~127 are not actually used.

Up to now, a signalling method for resource allocation in a wireless communication system capable of using one frequency band in the same manner as in the LTE system has been described. However, for example, in a wireless communication system such as the LTE-A system, a plurality of frequency bands are collected to construct a single system. In the present invention, a signalling method for resource allocation in a wireless communication system capable of using several frequency bands, and an apparatus for the signalling method will hereinafter be described in detail.

The LTE system evolved into the LTE-A system. Thus, the LTE system may be referred to as a 'Legacy System' for the LTE-A system. The LTE-A system must support backward compatibility with the LTE system. In other words, the LTE-A system must satisfy not only the efficiency caused by new technical characteristics but also the backward compatibility for the legacy system. The relationship between the efficiency and the backward compatibility may be a trade-off. Therefore, the operation for satisfying backward compatibility and at the same time increasing the efficiency is of importance to LTE-A system design. The present invention provides an RIV transmission/reception method and an apparatus thereof. The RIV transmission/reception method and apparatus can maintain the RIV transmission scheme used in the LTE system, and can indicate an additional resource allocation structure without increasing signalling overhead in the LTE-A system.

Figure 21:
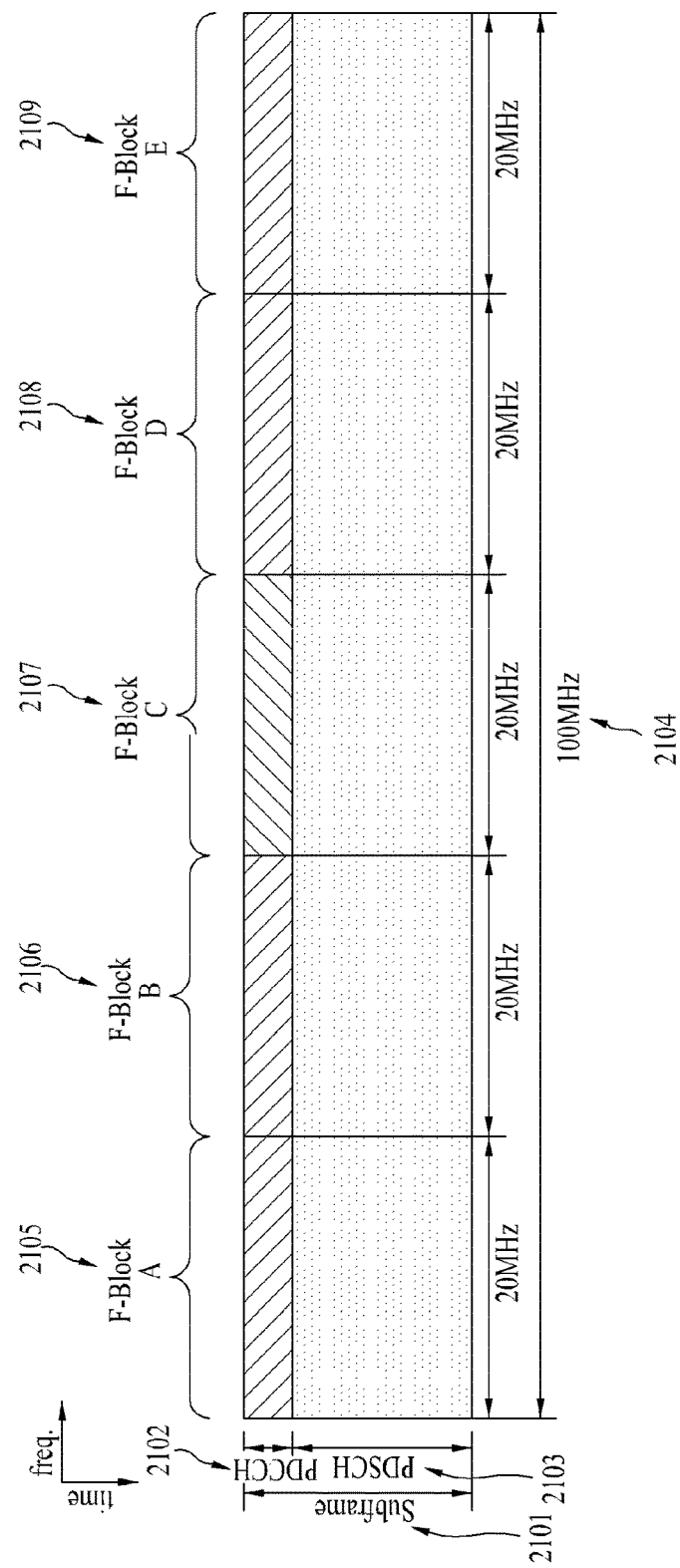
FIG. 21 is a view illustrating an example of a downlink channel structure in a wireless communication system capable of using a plurality of frequency bands according to one embodiment of the present invention.

FIG. 21 is a view illustrating an example of a downlink channel structure in a wireless communication system capable of using a plurality of frequency bands according to one embodiment of the present invention.

In FIG. 21, a horizontal axis indicates a frequency axis, and a vertical axis indicates a time axis. FIG. 21 shows only one subframe 2101 on a time axis for illustrative purpose. In LTE-A, one subframe may be composed of 12 or 14 OFDMA symbols. In the subframe 2101, PDCCH 2102 is transmitted earlier than the PDSCH 2103, and only some OFDM symbols are used. The whole frequency band has a 100 MHz bandwidth 2104, and includes 5 frequency blocks 2105, 2106, 2107, 2108 and 2109. Each of the five frequency blocks 2105, 2106, 2107, 2108 and 2109 has a 20 MHz bandwidth. In FIG. 21, 'frequency block' is denoted by 'F-block', and the number of frequency blocks may be denoted by $N_{F-Block}$. In FIG. 21, $N_{F-Block}$=5.

For example, a conventional wireless communication system is composed of only one 20 MHz frequency band, and performs scheduling of radio resources of this 20 MHz frequency band for UEs so that the radio resources are allocated to the UEs. In order to perform consecutive resource allocation as described above, the compact scheme can be used. In accordance with the compact scheme, valid combinations among all the possible combinations each of which is composed of a start point of RBs and a length of the RBs, are mapped to RIVs. The RIV is expressed by a bit field. The bit fields may be signaled.

In contrast, in the case of a wireless communication system including 5 frequency bands as shown in FIG. 21, a new resource allocation method different from the above-mentioned resource allocation method is needed to allocate resources to a multi-band supporting UE. In this case, the multi-band supporting UE indicates a UE capable of recognizing a plurality of frequency bands and at the same time receiving data from the frequency bands. It is preferable that the new resource allocation method be matched with resource allocation of a single-band supporting UE capable of receiving information of only one frequency band. In addition, it is preferable that overhead caused by the increasing frequency band be minimized if possible.

The resource allocation method for the multi-band supporting UE according to the present invention at least has the following characteristics.

The multi-band supporting UE can continually use K frequency bands according to its capability. Otherwise, a base station (BS) may semi-statically allocate K frequency bands to be used by the multi-band supporting UE, and may inform the multi-band supporting UE of the K frequency bands.

RIVs used for the single-band supporting UE can also be used for the multi-band supporting UE without any change. Thus, if there are K frequency bands, the multi-band supporting UE is allocated resources using K RIV fields. In this case, each RIV indicates resource allocation information for each frequency band.

In the meantime, the single-band supporting UE is allocated resources from only one frequency band, so that the number (L) of allocated RBs indicated by conventional RIVs is always greater than zero '0'. However, in some cases, only some bands among the K frequency bands may be used. In this case, there is no RIV indicating that the number of RBs allocated to the UE is 0 (i.e., L=0) in the conventional RIV table shown in FIG. 20. When using the conventional RIV table shown in FIG. 20, the above information of L=0, indicating the number of RBs allocated for the UE is not present in a specific unused frequency band, cannot be indicated. Therefore, there is needed a method for indicating the above-mentioned information of L=0 in the specific unused frequency band. The following method can be used to indicate the information of L=0, and a detailed description thereof will hereinafter be described.

When using the conventional RIV table shown in FIG. 20, RIVs undefined in this RIV table become invalid for an LTE user equipment (UE). For example, RIVs of value 210 to 255 in FIG. 20 become invalid for a conventional LTE UE. Therefore, RIVs defined in the conventional RIV table as FIG. 20 are referred to as valid RIVs, and other RIVs undefined in this RIV table are referred to as invalid RIVs. For example, RIVs from value 0 to 209 are valid RIVs, and RIVs from value 210 to 255 are invalid RIVs for FIG. 20.

In order to indicate that the number of RBs indicated by the above invalid RIVs is set to 0 (L=0), and in order to inform a multi-band supporting UE that the number of RBs allocated to the multi-band supporting UE is set to 0, the above-mentioned invalid RIVs can be used in the present invention. In other words, the present invention can indicate that there are no RBs allocated for a UE in a specific frequency band. For example, in FIG. 20, RIVs may have valid values from 0 to 209. In order to indicate such valid values, each RIV must be represented by a binary number having at least 8 bits. Because a binary number of 8 bits can represent values from 0 to 255 (=$2^8$−1), the 8-bit binary number can be used for further allocation of RIVs from 210 to 255 undefined in FIG. 20. Thus, if the RIV is set to any one of 210~255, it is possible to indicate an allocation status of RBs undefined in the table of FIG. 20 using the RIV of 210~255. Accordingly, for example, when the RB is set to a certain value ('11010010'≤RIV≤'11111111') selected from among 210~255, or if the RB is set to a specific value (RIV='11111111'), it can be predefined that such a RIV indicates that there are no RBs allocated for the UE in a corresponding frequency band.

In the meantime, in order to use invalid RIVs as described above, the assumption of the presence of invalid RIVs is needed. If the following equation 2 is satisfied, it can be verified that RIVs that are not used as actual values while being capable of being transferred are always present.

$$N \neq M, \text{ where, } N = \lceil \log_2(N_{RB}(N_{RB}+1)/2) \rceil, M = \log_2(N_{RB}(N_{RB}+1)/2)$$ [Equation 2]

In Equation 2, $$\frac{N_{RB}(N_{RB}+1)}{2}$$

is a total number of valid RIVs when the number of resource blocks is $N_{RB}$. In Equation 2, N is a minimum length of a binary number for indicating all the valid RIVs. However, if $$\frac{N_{RB}(N_{RB}+1)}{2}$$

is not a multiple of 2, M cannot have an integer value. In this case, in order to satisfy Equation 2, the following equation 3 must be established.

$$2^N \neq \frac{N_{RB}(N_{RB}+1)}{2}$$ [Equation 3]

Equation 3 can be represented by the following equation 4.

$$2^{N+1} \neq N_{RB}(N_{RB}+1)$$ [Equation 4]

In conclusion, if it is proved that Equation 4 is established, it can be seen that the aforementioned invalid RIVs always exist.

Assuming that $2^{N+1} = N_{RB}(N_{RB}+1)$ is established, ($N_{RB}=2^a$) and ($N_{RB}+1=2^b$) must be established. That is, $2^a+1=2^b$ must be satisfied. In this case, in order to satisfy $2^a+1=2^b$, 'a' must be set to 0 (a=0) and 'b' must be set to 1 (b=1). Therefore, $2^{N+1}=N_{RB}(N_{RB}+1)$ is achieved only in the case of $N_{RB}=1$. However, because $6 \leq N_{RB} \leq 110$ is given in the LTE, $2^{N+1} \neq N_{RB}(N_{RB}+1)$ is achieved. Thus, in the LTE, $2^{N+1}=N_{RB}(N_{RB}+1)$ is not achieved. Therefore, it is now proved that $N=\lceil \log_2(N_{RB}^{UL}(N_{RB}^{UL}+1)/2) \rceil \neq M=\log_2(N_{RB}^{UL}(N_{RB}^{UL}+1)/2)$ is satisfied in LTE, and that RIVs that are not used as actual values while being capable of being transmitted always exist in LTE. Therefore, the above-mentioned proposed method can be used for the LTE at all times.

Figure 22:
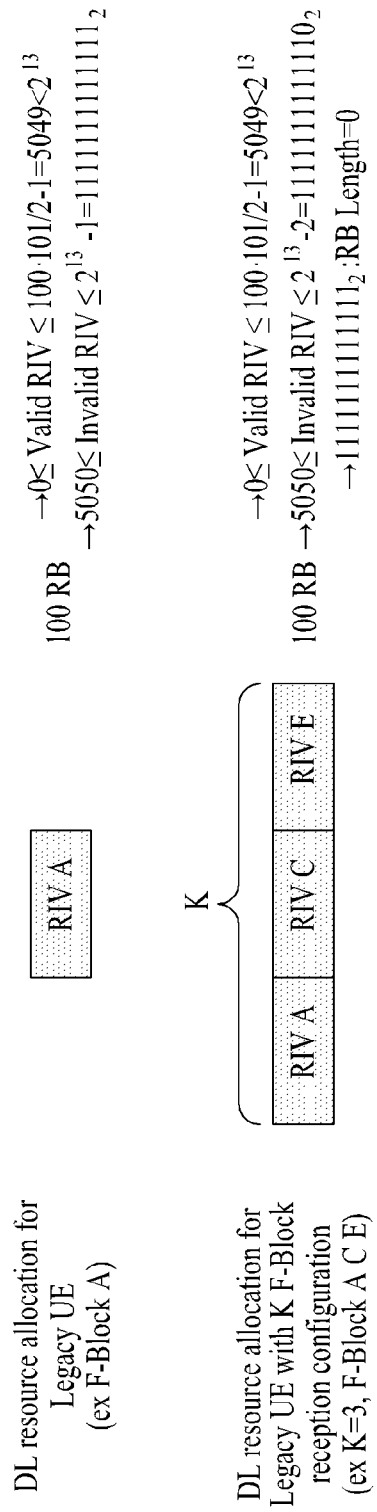
FIG. 22 is a view illustrating an example of RIVs used for allocating downlink resources in a wireless communication system capable of using a plurality of frequency bands.

FIG. 22 is a view illustrating an example of RIVs used for allocating downlink resources in a wireless communication system capable of using a plurality of frequency bands.

Assuming that 100 RBs are used in the legacy system, a valid RIV A has values from 0 to 5049. In order to indicate the values of 0~5049, a binary number having a total length of 13 bits is needed. Thus, values from 5050 to $2^{13}-1$ may be used for an invalid RIV A. Assuming that K frequency bands A, C and E are used and each band uses 100 RBs, each of RIV A, RIV C, and RIV E has the same valid values of 0~5049 and the same invalid values of 5050~$2^{13}-1$.

Figure 23:
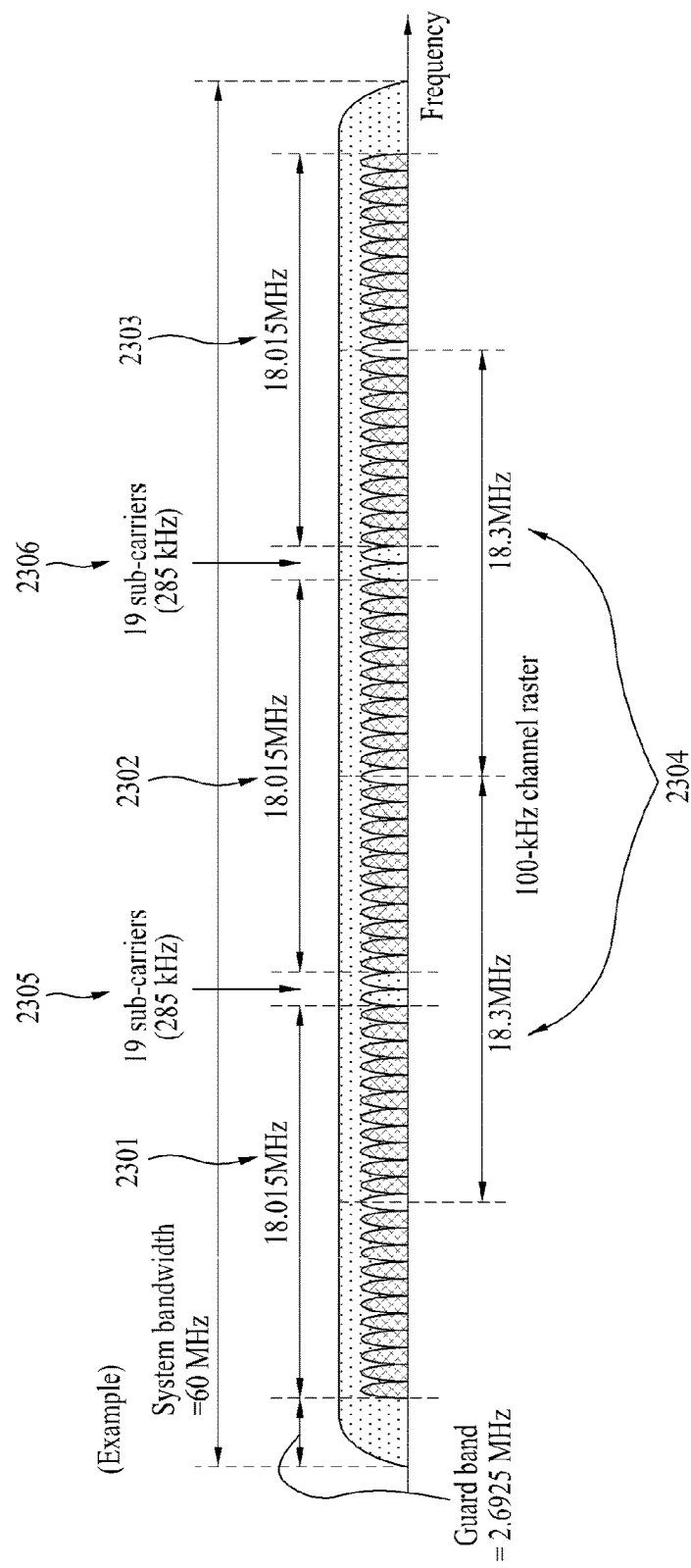
FIG. 23 shows an exemplary case in which a frequency band is extended to the 60 MHz-frequency band using three 20 MHz-frequency bands according to one embodiment of the present invention.

In the meantime, FIG. 23 shows an exemplary case in which a frequency band is extended to the 60 MHz-frequency band using three 20 MHz-frequency bands according to one embodiment of the present invention.

In legacy system, single-band supporting UEs are set to be synchronized with a frequency based on a multiple of 100 kHz. Therefore, in order to enable each of the single-band supporting UEs to separately access and use three 20 MHz bands 2301, 2302 and 2303, the center frequency (or an intermediate frequency) of a center subcarrier of each frequency band must be set to a multiple of 100 kHz so as to allow the single-band supporting UEs to establish initial synchronization therebetween. Assuming that an interval (i.e., spacing) between subcarriers shown in FIG. 23 is set to 15 kHz, in the case where the 60 MHz band is divided into three equal parts (i.e., three 20 MHz bands) and a center frequency spacing among the divided frequency bands is set to 20 MHz, it is impossible to satisfy the above-mentioned condition indicating the center subcarrier having the center frequency corresponding to a multiple of 100 KHz and 15 kHz. Accordingly, spacing among center frequencies of individual frequency bands must be set to a multiple of 300 kHz corresponding to a common multiple of 15 kHz and 100 KHz.

As can be seen from FIG. 23, assuming that the whole band is constructed by three neighboring frequency blocks each having the 20 MHz bandwidth, in the case where the spacing among center frequencies of individual frequency bands is set to 18.3 MHz (2304), three frequency bands are arranged to be adjacent to each other, thus constructing the whole band. In this case, since the center frequency spacing is set to 18.3 MHz, it can be seen that an overlap part of 1.7 MHz is generated between 20 MHz frequency bands.

The 18.3 MHz band (=15 kHz×1220) located between center frequencies of two neighboring frequency bands includes 1220 subcarriers. If Direct Current (DC) frequencies are excluded from the 1220 subcarriers, 1219 subcarriers can be used for data transmission. In this case, resource allocation in units of an RB composed of 12 subcarriers is performed in the legacy system, so that 1219 (=100−12+19) subcarriers can be classified into 100 RBs and 19 redundant subcarriers 2305 and 2306. Since 100 RBs are divided into two parts each having 50 RBs, this divided result may be used for the conventional allocation method for 20 MHz bands. However, 19 subcarriers 2305 and 2306 located among individual frequency bands cannot be resource-allocated by the conventional resource allocation method.

Accordingly, the present invention divides some or all of subcarriers incapable of being used in a frequency band of the legacy system into one or more blocks, and maps the divided blocks to specific invalid RIVs, so that these invalid RIVs is allocated to a multi-band supporting UE.

Each of subcarriers 2305 and 2306 that can be additionally used for the multi-band supporting UE is located at the centers of two frequency bands, respectively. Therefore, it can be predefined so that RIVs indicating the subcarriers 2305 and 2306 correspond to either of a low frequency band and a high frequency band. For example, the subcarrier 2305 may be indicated by an RIV from the frequency band 2301, and the subcarrier 2306 may be indicated by an RIV from the frequency band 2302. Alternatively, the subcarrier 2305 may be indicated by an RIV from the frequency band 2302, and the subcarrier 2306 may be indicated by an RIV from the frequency band 2303.

For example, in FIG. 23, the additionally available 19 subcarriers 2305 and 2306 can be newly grouped into one block. In this case, if 8 bits are needed to indicate each RIV, the above-mentioned new blocks may be indicated using a predetermined number, for example, a number ("11111110"=$2^{\text{\# of bits in bit field for RIV}}-2$) less than a maximum value capable of being indicated by 8 bits by 1. For example, if a multi-band supporting UE receives RIV="11111110" from the frequency band 2301, then it is recognized that the multi-band supporting UE is allocated a block composed of 19 subcarriers 2305. Otherwise, as described above, the multi-band supporting UE may receive the information of RIV="11111110" from the frequency band 2302. This operation of the multi-band supporting UE is equally carried out even for the other 19 subcarriers 2306.

In the meantime, the UE may simultaneously receive information of constituent bands (e.g., three 20 MHZ bands) of a 60 MHz band or may simultaneously receive information of constituent bands (e.g., two 20 MHz bands) of a 40 MHz band. The subcarrier (i.e., the center subcarrier) located at the center of the additionally-available subcarriers of the UE capable of simultaneously receiving 40 MHz-band information becomes a direct current (DC) frequency. In order to prevent reception performance of such a UE from being degraded, it is preferable that no data be transmitted to the center subcarrier located at the center of the additionally-available subcarriers.

For example, in FIG. 23, assuming that a specific UE can simultaneously receive information of the constituent bands (i.e., two frequency bands 2301 and 2302) of the 40 MHz band composed of two frequency bands 2301 and 2302, the 9-th subcarrier located at the center of 19 subcarriers 2305 capable of being additionally used by this UE becomes a DC frequency. Therefore, it is preferable not transmitting any data via the 9-th subcarrier. In another method, 12 subcarriers are selected from among 19 subcarriers to form a new RB, data may be transmitted via only the new RB but no data may be transferred via remaining 7 (=19−12) residual subcarriers. In this case, the 9-th subcarrier corresponding to the DC frequency may be contained in the 7 residual subcarriers.

Heretofore, the case in which a bandwidth between center frequencies of frequency bands (F-Blocks) is set to 18.3 MHz has been disclosed as an example. However, as described above, because it is enough to make the bandwidth between center frequencies satisfy a multiple of 300 KHz, the spacing between center frequencies may be not only 18.3 MHz, but also any one of 18.6 MHz, 18.9 MHz, 19.2 MHz, 19.5 MHz, 19.8 MHz, and the like. While only three frequency bands (three F-bands) each having the 20 MHz bandwidth are arranged to be adjacent to each other in FIG. 23, two, four, or five frequency bands may also be adjacent to each other as necessary.

Following Table 1 shows the number of additionally-available subcarriers present between frequency bands according to the center frequency spacing, under the condition that a plurality of frequency bands of the conventional LTE system capable of transmitting 100 RBs are adjacent to each other. In addition, Table 1 also indicates a guard band size in the whole band according to the number of frequency bands.

TABLE 1

| BW between center subcarriers of F-Blocks (MHz) | RBs/F-Block | Additional usable subcarriers between F-Blocks | Possible # of partition for additional usable subcarriers | # of F-block | | | | |
|---|---|---|---|---|---|---|---|---|
| | | | | 1 20 MHz Guard Band (kHz) | 2 40 MHz Guard Band (kHz) | 3 60 MHz Guard Band (kHz) | 4 80 MHz Guard Band (kHz) | 5 100 MHz Guard Band (kHz) |
| 18.3 | 100 | 19 | 1 | 992.5 | 1842.5 | 2692.5 | 3542.5 | 4392.5 |
| 18.6 | 100 | 39 | 3 | 992.5 | 1692.5 | 2392.5 | 3092.5 | 3792.5 |
| 18.9 | 100 | 59 | 4 | 992.5 | 1542.5 | 2092.5 | 2642.5 | 3192.5 |
| 19.2 | 100 | 79 | 6 | 992.5 | 1392.5 | 1792.5 | 2192.5 | 2592.5 |
| 19.5 | 100 | 99 | 8 | 992.5 | 1242.5 | 1492.5 | 1742.5 | 1992.5 |
| 19.8 | 100 | 119 | 9 | 992.5 | 1092.5 | 1192.5 | 1292.5 | 1392.5 |

As can be seen from Table 1, as the spacing between center frequencies of individual frequency bands increases in the order of 18.6 MHz→18.9 MHz→19.2 MHz→19.5 MHz→19.8 MHz, the number of subcarriers capable of additionally transmitting data also increases in the order of 39→59→79→99→119. In this case, the above-mentioned operation in which the additionally-available subcarriers are grouped and are then distributively allocated to several UEs is more advantageous for an improvement of resource use efficiency.

In this case, it is preferable that one divided part be composed of 12 subcarriers. Such resources can be converted into a separate value $RIV_{add}$ according to the number of divided parts. Then this $RIV_{add}$ can be made to mapped to a specific invalid RIV, and this invalid RIV may be allocated to the multi-band supporting UE. For example, if the number of divided parts is 3, a maximum $RIV_{add}$ is set to 5 (=3×4/2−1). In order to indicate this maximum $RIV_{add}$, 6 statuses are needed. For example, the 6 statuses can be designated by a specific value acquired by deducting ($RIV_{add}$+1) from a maximum value capable of being expressed by a binary bit field for RIV indication, i.e., the 6 statuses can be designated by numbers from $2^{\text{\# of bits in bit filed for RIV}}-1-RIV_{add}-1$ to $2^{\text{\# of bits in bit filed for RIV}}-2$. Each of the 6 statuses indicates how the three divided parts have been allocated to the multi-band supporting UE. While the above-mentioned description has disclosed the use of three divided parts as an example, the same method as described above may also be used even though the number of divided parts is set to any value other than 3. In other words, assuming that a maximum $RIV_{add}$ is $R_{add,Ndiv}$ when the number of divided parts is denoted by 'Ndiv', ($RIV_{add,Ndiv}$+1) values among the invalid RIVs may be used to indicate how the additionally-available subcarrier divided parts have been allocated to the multi-band supporting UE.

First Embodiment (Embodiment 1)

One embodiment of the present invention relates to a method for detecting a Resource Indication Value (RIV) indicating a start index (S) and length (L) of consecutive VRBs allocated to a first UE capable of simultaneously receiving information from several frequency bands in a wireless mobile communication system capable of using a plurality of frequency bands. This method includes a step for enabling a first UE to receive and detect the RIV. In this case, the detected RIV is greater than the maximum value of RIVs allocated to a second UE capable of receiving information from only one frequency band.

In the first embodiment (Embodiment 1), the length of a binary bit field indicating an RIV detected by the first UE is equal to that of another binary bit field indicating an RIV allocated to the second UE. The length (L) of consecutive VRBs denoted by the detected RIV may be set to 0.

In the first embodiment (Embodiment 1), the second subcarriers are grouped into one or more divided parts, each divided part is composed of N second subcarriers, and the RIV detected by the first UE indicates the start position of the divided parts and the number of the divided parts. Preferably, N is set to 12 (N=12).

Second Embodiment (Embodiment 2)

Another embodiment of the present invention relates to a method for detecting an RIV indicating a start index (S) and length (L) of consecutive VRBs allocated to a first UE capable of simultaneously receiving information from several frequency bands in a wireless mobile communication system capable of using a plurality of frequency bands. This method includes a step for enabling a base station (BS) to transmit the RIV to the first UE. In this case, the transmitted RIV is greater than a maximum value of RIVs allocated to a second UE capable of receiving information from only one frequency band.

In the second embodiment (Embodiment 2), the length of a binary bit field indicating the RIV transmitted to the first UE is equal to that of another binary bit field indicating an RIV allocated to the second UE. The length (L) of consecutive VRBs denoted by the transmitted RIV may be set to 0.

In the second embodiment (Embodiment 2), the second subcarriers are grouped into one or more divided parts, each divided part is composed of N second subcarriers, and the RIV transmitted to the first UE indicates the start position of the divided parts and the number of the divided parts. Preferably, N is set to 12 (N=12).

In the first embodiment (Embodiment 1) and the second embodiment (Embodiment 2), spacing among center frequencies of individual frequency bands may be set to a multiple of 300 kHz, each frequency band may include 100 resource blocks (RBs), one RB may be composed of 12 subcarriers, and the second subcarriers other than the first subcarriers belonging to the 100 RBs among all subcarriers contained in each frequency band may be allocated only to the first UE. In addition, the number of frequency bands is 2, and no data is transmitted through a specific second subcarrier located at the center part of the above second subcarriers located between the two frequency bands.

In the above-mentioned first and second embodiments, the second subcarriers may correspond to subcarriers 2305 and 2306 of FIG. 23, and the first subcarriers may correspond to subcarriers other than the subcarriers 2305 and 2306 among all subcarriers shown in FIG. 23.

Figure 24:
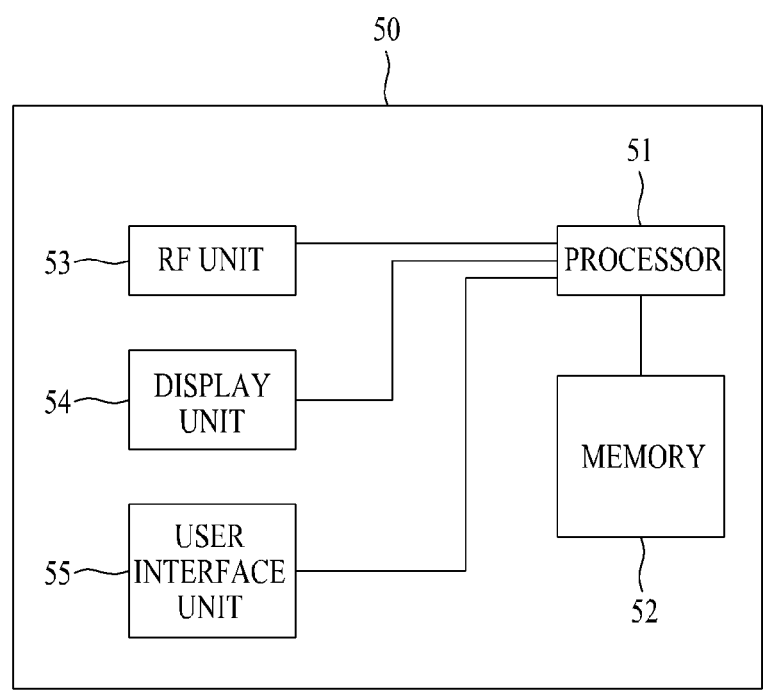
FIG. 24 is a block diagram illustrating constituent elements of a device applicable to the present invention.

FIG. 24 is a block diagram illustrating constituent elements of a device 50 applicable to the present invention. In FIG. 24, the device 50 may be a UE or a base station (BS). In addition, the above-mentioned method of the present invention can be implemented by this device 50. The device 50 includes a processor 51, a memory 52, an RF unit 53, a display unit 54, and a user interface unit 55. Layers of the radio interface protocol are realized in the processor 51. The processor 51 provides a control plane and a user plane. Functions of individual layers can be implemented in the processor 51. The processor 51 may include a contention resolution timer. The memory 52 is connected to the processor 51 and stores an operating system, applications, and general files. If the device 50 is a UE, the display unit 54 displays various information, and may use well-known elements such as a Liquid Crystal Display (LCD), an Organic Light Emitting Diode (OLED), and the like. The user interface unit 55 may be constructed with a combination of well-known user interfaces such as a keypad, a touch screen, and the like. The RF unit 53 is connected to the processor 51 so that it can transmit and receive RF signals to and from the processor 51.

Third Embodiment (Embodiment 3)

If the device 50 is a UE, the step for receiving and detecting the RIV by the first UE in the first embodiment may be carried out by the RF unit 53 and the processor 51.

Fourth Embodiment (Embodiment 4)

If the device 50 is a base station (BS), the step for transmitting the RIV from the base station (BS) to the first UE in the second embodiment may be carried out by the RF unit 53 and the processor 51.

Although the present invention has been disclosed by referring to the above-mentioned embodiments, it should be noted that the aforementioned embodiments have been disclosed only for illustrative purposes, and those skilled in the art will appreciate that various modifications, additions and substitutions are possible, without departing from the scope and spirit of the invention as disclosed in the accompanying claims. Thus, it is intended that the present invention covers the modifications and variations of this invention provided they come within the scope of the appended claims and their equivalents. Therefore, the present invention is not limited to only the above-mentioned embodiments, but can be applied to other examples which can satisfy the above principles and new characteristics of the present invention.

As apparent from the above description, the present invention is applicable to a transmitter and a receiver used in a broadband wireless mobile communication system.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for receiving data from a base station by a first type user equipment (UE) capable of simultaneously using a plurality of frequency bands based on resource allocation in a first wireless mobile communication system, wherein each of the plurality of frequency bands has a respective bandwidth in which a second wireless mobile communication system serves a second type UE not capable of simultaneously using the plurality of frequency bands, the method comprising:

receiving resource indication values (RIVs) from the base station, wherein the RIVs include a first type RIV indicating a start index (S) and a length (L) of virtual resource blocks (VRBs) allocated to the first type UE, and a second type RIV indicating that no resource is allocated to the first type UE within one of the plurality of frequency bands, wherein the second type RIV has a value which is invalid as the first type RIV for the second type UE, wherein at least one of the plurality of frequency bands comprises a common resource area and a first type UE-specific resource area, wherein the common resource area is for both the first type UE and the second type UE in case the second type UE is served on the at least one of the plurality of frequency bands, wherein the first type UE-specific resource area is specifically configured for the first type UE, and wherein the second type RIV is received through the first type UE-specific resource area among the common resource area and the first type UE-specific resource area; and receiving data from the base station based on the RIVs.

2. The method of claim 1, wherein the first type UE-specific resource area comprises frequency resources not detectable by the second type UE.

3. The method of claim 1, wherein both of the first wireless mobile communication system and the second wireless mobile communication system support a compact scheduling scheme using the RIVs.

4. The method of claim 3, wherein the first type RIV a RIV for the first type UE is received through the common resource area, and wherein the first type RIV for the first type UE has a same format as the first type RIV for the second type UE.

5. The method of claim 3, wherein the second type RIV indicates that L is set to zero.

6. A first type user equipment (UE) adapted to receive data from a base station, the first type UE comprising:

a processor; and a memory storing instructions that, when executed by the processor, cause the first type UE to:

simultaneously use a plurality of frequency bands based on resource allocation in a first wireless mobile communication system, wherein each of the plurality of frequency bands has a respective bandwidth in which a second wireless mobile communication system serves a second type UE not capable of simultaneously using the plurality of frequency bands; and receive resource indication values (RIVs) from the base station, wherein the RIVs include a first type RIV indicating a start index (S) and a length (L) of virtual resource blocks (VRBs) allocated to the first type UE, and a second type RIV indicating that no resource is allocated to the first type UE within one of the plurality of frequency bands, wherein the second type RIV has a value which is invalid as the first type RIV for the second type UE, wherein at least one of the plurality of frequency bands comprises a common resource area and a first type UE-specific resource area, wherein the common resource area is for both the first type UE and the second type UE, wherein the first type UE-specific resource area is specifically configured for the first type UE, and wherein the second type RIV is received through the first type UE-specific resource area among the common resource area and the first type UE-specific resource area, and to receive data from the base station based on the RIVs.

7. The first type UE of claim 6, wherein the first type UE-specific resource area comprises frequency resources not detectable by the second type UE.

8. The first type UE of claim 6, wherein both of the first wireless mobile communication system and the second wireless mobile communication system support a compact scheduling scheme using the RIVs.

9. The first type UE of claim 8, wherein the first type RIV a RIV for the first type UE is received through the common resource area, and wherein the first type RIV for the first type UE has a same format as the first type RIV-a for the second type UE.

10. The first type UE of claim 8, wherein the second type RIV indicates that L is set to zero.

\* \* \* \* \*